(12) United States Patent
Huang et al.

(10) Patent No.: US 10,462,640 B1
(45) Date of Patent: *Oct. 29, 2019

(54) SYSTEMS AND METHODS FOR HIERARCHICAL COMMUNICATION CHANNELS

(71) Applicant: NewsOnChat Inc., Santa Clara, CA (US)

(72) Inventors: Andy Huang, Cupertino, CA (US); Mingliang Li, Sunnyvale, CA (US)

(73) Assignee: NEWSONCHAT INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,510

(22) Filed: Aug. 21, 2018

Related U.S. Application Data

(63) Continuation of application No. 15/451,261, filed on Mar. 6, 2017, now Pat. No. 10,085,141.

(60) Provisional application No. 62/304,220, filed on Mar. 6, 2016.

(51) Int. Cl.
| H04M 11/04 | (2006.01) |
| H04W 4/90 | (2018.01) |
| H04W 4/12 | (2009.01) |
| H04W 4/06 | (2009.01) |
| H04L 29/08 | (2006.01) |

(52) U.S. Cl.
CPC .............. H04W 4/90 (2018.02); H04L 67/26 (2013.01); H04W 4/06 (2013.01); H04W 4/12 (2013.01)

(58) Field of Classification Search
CPC ........... H04W 4/22; H04W 4/06; H04W 4/12; H04L 67/26

USPC ...................................................... 455/404.1
See application file for complete search history.

(56) References Cited

U.S. PATENT DOCUMENTS

| 9,207,755 | B2 | 12/2015 | Byrnes et al. |
| 9,230,288 | B2 | 1/2016 | Elias et al. |
| 9,235,335 | B2 | 1/2016 | Morrill et al. |
| 9,247,386 | B2 | 1/2016 | Kau et al. |
| 9,264,462 | B2 | 2/2016 | Heiferman et al. |
| 9,269,112 | B1 | 2/2016 | Manimaran |
| 9,277,366 | B2 | 3/2016 | Busch |
| 10,085,141 | B1* | 9/2018 | Huang ............... H04W 4/90 |
| 2007/0061245 | A1 | 3/2007 | Ramer et al. |
| 2007/0094042 | A1 | 4/2007 | Ramer et al. |
| 2008/0155080 | A1* | 6/2008 | Marlow ............... H04L 12/66 709/223 |
| 2010/0082431 | A1 | 4/2010 | Ramer et al. |
| 2011/0208822 | A1 | 8/2011 | Rathod |
| 2012/0036209 | A1 | 2/2012 | Lewis et al. |

(Continued)

OTHER PUBLICATIONS

Co-pending U.S. Appl. No. 15/451,261, filed Mar. 6, 2017.

(Continued)

*Primary Examiner* — Marceau Milord
(74) *Attorney, Agent, or Firm* — Wilson Sonsini Goodrich & Rosati

(57) ABSTRACT

Systems and related methods for providing hierarchical group communication channels for various organizations, wherein the groups may also be dynamically created based on the real-time or near real-time data collected from one or more mobile computing devices. The disclosed system and methods may provide hierarchical organizations with efficient means to organize and manage critical tasks, especially under emergency situations.

20 Claims, 13 Drawing Sheets

(56) References Cited

U.S. PATENT DOCUMENTS

| | | | |
|---|---|---|---|
| 2013/0110565 A1* | 5/2013 | Means, Jr. | ............ G06Q 10/06 |
| | | | 705/7.11 |
| 2014/0244488 A1 | 8/2014 | Kim et al. | |
| 2015/0271557 A1 | 9/2015 | Tabe | |
| 2015/0365787 A1 | 12/2015 | Farrell | |
| 2017/0034305 A1* | 2/2017 | Blevins | .................. H04L 67/42 |

OTHER PUBLICATIONS

U.S. Appl. No. 15/451,261 Notice of Allowance dated May 25, 2018.
U.S. Appl. No. 15/451,261 Office Action dated Nov. 2, 2017.

* cited by examiner

| | Column 510 | Column 520 | Column 530 |
|---|---|---|---|
| | Visible Scope | Groups which can do name search or apply to join the group (e.g., potential applicants) [521] | Groups which can do member search or invite members to join other groups [531] |
| 511 | Open | Public = {id: public, roles:[owners, moderators, members], scopes: [self]} [522] | Public [532] |
| 512 | Public | Public [523] | Org = {id: corporate, roles: [owners, moderators, members], scopes:[self, subordinate group]} [533] |
| 513 | Corporate | Org Extension = {id: corporate, roles: [owners, moderators, members], scopes: [self, subordinate groups, auxiliary groups]} [524] | Org [534] |
| 514 | Hierarchical | Org [525] | Hierarchy={id: corporate, roles: [owners, moderators, members], scopes: [self, subordinate groups, superior groups]} [535] |
| 515 | Private | Org [526] | Group={id: self, roles: [owners, moderators, members], scopes: [self]} [536] |
| 516 | Secret / Hidden / Closed | Group [527] | Group [537] |

*FIG. 5*

SYSTEMS AND METHODS FOR HIERARCHICAL COMMUNICATION CHANNELS

CROSS-REFERENCE

This application is a Continuation Application of U.S. application Ser. No. 15/451,261, filed Mar. 6, 2017, which claims priority to U.S. Provisional Application No. 62/304,220 filed on Mar. 6, 2016, each of which is incorporated herein by reference in its entirety.

BACKGROUND

The primary challenge of today's Information Technology (IT) industry is to eliminate the deficiencies of the most frequently used communication standards, E-mail, Blogs, Forum, and Chat (EBFC). E-mail is plagued with relentless spams and unsecured server nodes; Blogs support only broadcasting but lack discussion; Forums support discussion but are limited to topic only; and Chat supports instant message type discussion but is size limited in both messages and groups. The various forms of communication standards/methods may be ill-suited for communicating across organizational hierarchies and especially ill-suited for organizing activities and communicating critical information during emergency situations (e.g., tsunami, earthquake, etc.)

Organizations, especially Non Profit and/or Charity organizations, may also face challenges when figuring out how to take advantage of various communication standards, including one or more of abovementioned EBFC communication methods for their mission critical tasks. For example, mission critical tasks of disaster response organizations may involve the management of volunteers, safety of volunteers and clients, just-in-time delivery of resources and logistic supplies, administration of clients, etc., as well as cost-efficient and effective means for fund raising. Faith based organizations, on the other hand, may require communication platforms which could handle their mission critical tasks, such as managing weekly gatherings, broadcasting location of events, recruiting/organizing/managing volunteers, and also the cost-effective and efficient means of fund raising, etc. For community based organizations, the mission critical tasks may include recruiting/organizing/managing volunteers, organizing/announcing/managing events or classes, communicating with volunteers and clients, and reducing the cost of fund raising. Overall, these organizations are hierarchical in nature and may have to deal with mission critical tasks, sometimes in emergency situations. Thus, current communication methods and standards (e.g., EBFC) may not be flexible or customizable enough to be adapted to or meet the needs of such organizations.

SUMMARY

Recognized herein is the need to for systems and related methods which can be adapted to hierarchical organization (i.e., organization with hierarchical organizational/management structures) with mission critical tasks. These mission critical tasks may also be required to be performed in emergency situations. Provided herein are systems and methods for a mobile communication platform which provides a hierarchical communication channel adaptable to hierarchical organizations or tiered organizations when managing real-time events, tasks, or situations. In addition, the present disclosure may also provide customizable features for groups or group members to coordinate various resources and communicate with one another in emergency situations, thereby providing numerous benefits not available in current EBFC technologies. The disclosed systems and methods may be configured to dynamically create groups for specific objectives and tasks.

The systems and related methods described herein may provide benefits for various types of organizations. For example, when disaster strikes, disaster response organizations can use the systems and methods described herein to announce the natural disaster, confirm its volunteers' availability instantly, and expedite the process of collecting donations worldwide. During a natural disaster, every minute counts between life and death, and systems and methods described herein can be configured to automatically send real-time message alerts (as opposed to calling and emailing each volunteer to coordinate), thereby potentially saving thousands of lives in those situations. The disclosed system can also be used for man-made disasters (e.g. terrorist attacks), in which each government may use the disclosed technology to inform residents and/or businesses within certain distances of a pending/imminent or an on-going threat, while also requesting financial donations and assistance from various users and/or members to address the crisis.

Other types of organization can also benefit from the systems and methods disclosed herein. For example, faith based organizations may, for example, broadcast upcoming events to invite all potential attendees worldwide, confirm attendee's reservations instantly, and receive their donations via the disclosed platform. In addition, these faith based organizations can upload narratives of the relevant events in the form of text, picture, video, or attachment. During the event, the organizer can stream the presenter's message/sermon live, request attendee's comment on the event, rate the presenters, and provide a summary of the event's popularity, which may contribute to improve future events and the quality of future events. Additionally, event organizers can request donations for copy of the presenter's handout, the right to view stream videos of the presentation/message, and event memento.

In another example, community service organizations can also take advantage of the present disclosure to announce all the latest classes (including details such as time, location, fee, etc.), sign-up class attendees, and process all of the class tuition payments. In other examples, a San Francisco's gym member may take advantage of the disclosed application to reserve his/her class or exercise coach/trainer in various locations while on the go (e.g., booking classes via a mobile application while boarding their flight to New York).

In addition to the benefits and advantages listed above, other numerous benefits and features are provided for by the disclosed system. For example, the disclosed system is configured for any users to create one or more groups (i.e., number of group N being an integer value) consisting of one or more users, wherein the group can be permanent (e.g., static) or temporary (e.g., dynamic). A group can be smaller than or a subsidiary (sub-group) of a larger group, or the group can be a larger than or ranked above (super-group) of other smaller or subsidiary groups. The disclosed system may also be configured such that one or more types of groups can flexibly be created by users, wherein the users can be fulfilling a certain type of role within the group, such as an owner, manager, or a moderator. In such configurations, for example, owners and/or moderators can designate other owners and/or moderators, and owners and/or moderators may have the right to add/delete other users from the group, the right to modify group to become a super-group or a sub-group of other groups, and the right to merge or divide their own group.

The disclosed system may also provide benefits and features wherein the user can create groups by inviting other people, for example, from the user's contact list, adding people from other groups that the user is also a member of, where the invitation can be sent periodically by voice, text, email, social network media platform, etc. Additionally, users can invite other people to join who are within certain distances from user's location (based on, for example, Global Positioning System on the user's device). The user may be carrying a mobile computing device with Bluetooth, or Wi-Fi, or any other wired or wireless communication enabled devices. Furthermore, the user may create temporary dynamic groups, which can be created by inviting any people, any users, or users from an existing group, where the temporary group can become a permanent new group, a sub-group of a larger group, or a super-group of a smaller group.

Another feature or benefit of the system disclosed herein can include a communication channel for announcing various events to users, wherein the invited users can efficiently respond to the invitation with his/her availability. The system may then be configured to automatically create a new group for available users.

The disclosed system may also be configured to track user location with the Global Positioning System (GPS). The system can check the user's health and/or welfare periodically, update the user's situation status, and allow users to report any updates. The system may further be configured to request resources, including but not limited to volunteers, logistics, supplies, food, water, equipment, etc. for events, to track, including but not limited to delivery, inventory, usage, disposal, etc., and to replenish resources.

Furthermore, the system and methods disclosed herein may be configured to manage events comprising of multiple government, non-government organizations, or corporations or any other organizations with hierarchical structures. The system may also be configured to maintain unity of command, update organization lists via addition/delete operations, and update command staff via addition/deletion operations. Furthermore, in emergency or critical situations, the system may be configured for the user to alert the user's own emergency situation by, for example, highlighting the user's GPS location, flashing multiple available lights in various colors for user, and/or generating audible sound (e.g., emergency sirens) in various tones and/or tempo for user. The system may also be configured for the user to alert other people and/or user of an emergency situation around a designated location, alert other user by flashing multiple available lights in various colors, and/or alert other users by generating sound that may be indicative of emergency situations in various tones/tempo for other user. Additionally, the user may forward/receive post messages, text, picture, video, attachment, etc., to other groups, other social network media platform, or other software/internet platform. The user may also provide comment/rating on other user's postings, and the system may also be configured to display all user's comment/rating (e.g., similar to a survey), to display the analytics of all user's comment/rating in real-time/periodically (e.g., similar to a poll).

The user may also review various financial metrics that are relevant to the organization, the group, or the users, such as bills and invoices, including but not limited to, utility (gas/electric/water/sewer/garbage-collection/telephone, etc.), financial institution (credit-card/mortgage/rent/lease/car, etc.), insurance (health/car/home, etc.), government (tax/student-loan, etc.), personal (loan/invoice, etc.) etc., to pay various bills, and to send bills/invoices to other users. The system may be configured such that the bill/invoice owner can provide feedback on payee (e.g., feedback on the timeliness of payment of bills, or the system may be configured to provide options to update the user's profile/rating indicating on-time-payment, periodic delay of payment, or frequent delay of payments. Furthermore, the system disclosed herein may also be configured to display the user's accumulated feedback from his/her bill owner in various color/rating/numeric form, where the feedback or rating; for example, a feedback of "red/late/3" may be for frequent delay of payment, and "yellow/fair/2" may indicate periodic delay of payment, and "green/good/1" may indicate on time payment.

Other features of the disclosed system may include the ability for a user/group to join other groups that may match the user's or the group's profile/interest, or other groups or users within certain distance from the user's or the group's permanent/temporary location.

The system may also be configured such that the user or the group can select different privacy settings, select "low" for no encryption of all user/group postings in the form of text, picture, video, attachment, and the like; the user may also select "medium" for some level of encryption of user/group selected postings; the user may also select "high" for full encryption of all user/group postings, and may be able to select "extra" for end-to-end extra algorithm full encryption of all user/group postings.

The system and related methods disclosed herein may be configured such that a user/group can select different settings for deleting or erasing operations. For example, the user may select "all" for deletion of all user or group postings, including but not limited to text, picture, video, attachment, etc. after certain selected time period, select partial for selective deletion of user/group postings after certain selected time period, and select none for no deletion of all user/group postings.

The system and related methods disclosed herein may also facilitate methods to donate/finance certain charity organizations or initiatives based on analytics of the interest of user/group/topic within a given time period, wherein the interest level can be measured by, including but not limited to, frequency of comment, number of active users in a topic, or rating of posting, etc.

In some embodiment, a computer-implemented method for providing a hierarchical communication channel for a plurality of users on a mobile computing device for managing real-time events may comprise: transmitting, to a server, information associated with a plurality of mobile computing devices, wherein the plurality of the mobile computing devices are respectively associated with the plurality of users; processing the information associated with the plurality of the mobile computing devices, thereby obtaining information on the plurality of the users; receiving, on the mobile computing device of a user, the information on the plurality of the users, wherein each user is one of the plurality of the users and each of the plurality of the users is associated with a group among a plurality of groups, the plurality of groups forming a hierarchical structure displaying, on a mobile application resident on the mobile computing device, the information on the plurality of the users, wherein the information on the plurality of the users include at least two or more of a role attribute, a group attribute, status of the users, and location of the users; and providing, on the mobile application, the hierarchical communication channel for the plurality of the users.

In other embodiments, the information on the plurality of the users may further include a wellness indicator of the user, wherein the wellness indicator is based at least on one or more biometric sensors associated with the user, the one or more biometric sensors communicatively coupled to the mobile computing device.

In other embodiments, the role attribute may include a role type and a role policy for each of the role type among a plurality of role types, wherein each of the plurality of groups include at least three role types, the role policy configured to restrict one or more settings for communication among the different role types.

In some embodiments, the group attribute may include a group type and a group policy, wherein each of the group type among a plurality of group types has a distinct group policy, the group policy configured to determine relationships among the plurality of groups and set one or more restrictions on the hierarchical communication channel.

In other embodiments, the computer-implemented method for providing a hierarchical communication channel for a plurality of users on a mobile computing device for managing real-time events may further comprise automatically creating a temporary group of two or more users based at least on the status of the users and the location of the users, wherein the status indicates the availability of the user and wherein the location of the users is based on the Global Positioning Sensor of the mobile computing device.

In other embodiments, the computer-implemented method for providing a hierarchical communication channel for a plurality of users on a mobile computing device for managing real-time events may further comprise receiving, on the mobile computing device, the information on available resources for the real-time event, wherein the available resources include logistics, supplies, and volunteers.

In some embodiments, the real-time event may be an emergency situation, and wherein the mobile application is configured to alert one or more users of the emergency situation, the one or more users located within a designated area, wherein the designated area is within a certain distance away from the emergency situation.

In some embodiments, the mobile application may further be configured to flash one or more different colors on the display of the mobile computing device of the one or more users. In other embodiments, the mobile application may further be configured to generate one or more types of audible tones on the mobile computing device of the one or more users.

In some embodiments, the mobile application may further be configured to send notifications to a group of users based on the information of the plurality of users, thereby coordinating the group of users to avoid or aid the emergency situation.

In some embodiments, a system for providing a hierarchical communication platform for a plurality of users on a mobile computing device for managing real-time events may comprise: a processor; and a mobile application resident on the mobile computing device configured to be operated by the processor to: transmit, to a server, information associated with a plurality of mobile computing devices, wherein the plurality of the mobile computing devices are respectively associated with a plurality of users using the mobile application; process the information associated with the plurality of the mobile computing devices, and thereby obtain information on the plurality of the users; receive, on the mobile computing device of a user, the information on the plurality of the users, wherein each user is one of the plurality of the users and each of the plurality of the users is associated with a group among a plurality of groups, the plurality of groups forming a hierarchical structure; display, on a mobile application resident on the mobile computing device, the information on the plurality of the users, wherein the information on the plurality of the users include at least two or more of a role attribute, a group attribute, status of the users, and location of the users; and provide, on the mobile application, the hierarchical communication channel for the plurality of the users and the plurality of the groups.

In some embodiments, the information on the plurality of the users may further include a wellness indicator of the user, wherein the wellness indicator can be based at least on one or more biometric sensors associated with the user, the one or more biometric sensors communicatively coupled to the mobile computing device.

In some embodiments, the role attribute may include a role type and a role policy for each of the role type among a plurality of role types, wherein each of the plurality of groups include at least three role types, the role policy configured to restrict one or more settings for communication among the different role types.

In some embodiments, the group attribute may include a group type and a group policy, wherein each of the group type among a plurality of group types has a distinct group policy, the group policy configured to determine relationships among the plurality of groups and set one or more restrictions on the hierarchical communication channel.

In some embodiments, the mobile computing device may be further configured to automatically create a temporary group of two or more users based at least on the status and the location of the users, wherein the status indicates the availability of the user and wherein the location of the users is based on the Global Positioning Sensor of the mobile computing device.

In some embodiments, the mobile computing device may further be configured to receive the information on available resources for the real-time event, wherein the available resources including logistics, supplies, and volunteers.

In some embodiments, the real-time event may be an emergency situation, and the mobile application may be configured to alert one or more users of the emergency situation. The one or more users may be located within a designated area, wherein the designated area is within a certain distance away from the emergency situation.

In some embodiments, the mobile application may further be configured to flash one or more different colors on the display of the mobile computing device of the one or more users.

In some embodiments, the mobile application may further be configured to generate one or more types of audible tones on the mobile computing device of the one or more users.

In some embodiments, the mobile application may further be configured to send notifications to a group of users based on the information of the plurality of users, thereby coordinating the group of users to avoid or aid the emergency situation.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

FIG. 5 illustrates a group policy setting for the hierarchical communication system in accordance with some embodiments;

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Figure 1:
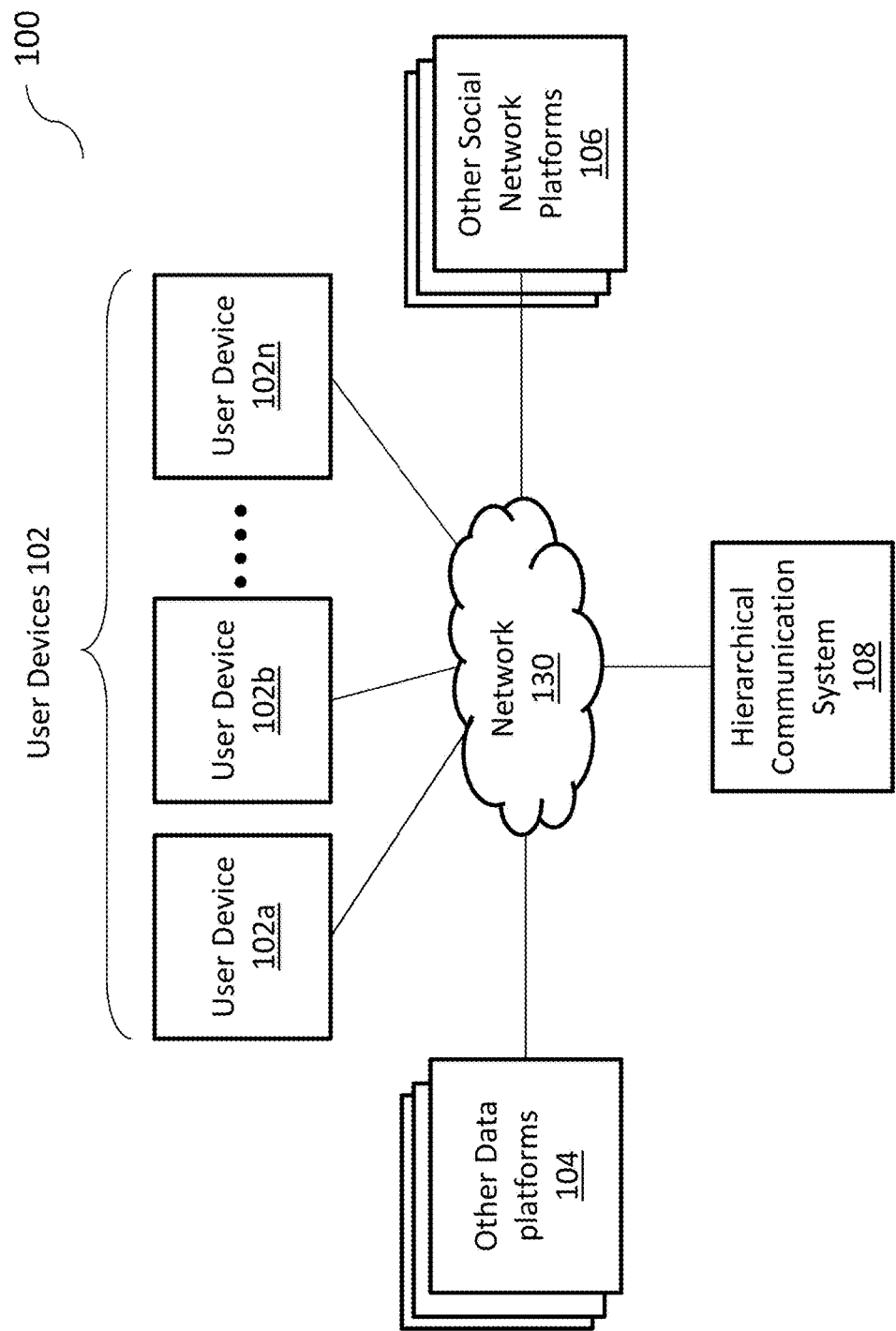
FIG. 1 illustrates an environment for a hierarchical communication system in accordance with some embodiments.

FIG. 1 illustrates an environment for a hierarchical communication system according to an embodiment. The hierarchical communication system 108 can interact with one or more user devices 102, other data platforms 104, and other social network platforms 106 through one or more communication networks 130.

The hierarchical communication system 108 may be configured to provide a user with a hierarchical communication platform by utilizing device information of the user devices 102, the user's information, and information or data that may be obtained from other data platforms 104 or other social network platforms 106. The hierarchical communication system 108 may comprise servers and database systems, which may interact with other data platforms 104, other social network platforms 106, and the user devices 102 to collect or retrieve relevant information. Relevant information may include the user's device information, user's location, the user's social network, user's health or wellness related data, data related to the environment, region, or the location of the user devices 102, including any impending threats or emergency situation, or other data such as news, etc.

User devices 102, such as a user device 102a, user devices 102b, and a user devices 102n, may be any devices associated with one or more users, such as a cellular telephone, a personal digital assistant (PDAs), a tablet, a desktop or a laptop computer, a wearable device, or any other devices including computing functionality and data communication capabilities. The user devices 102 may be configured to enable the user to receive or post text, comments, photos, and the like in the hierarchical communication channel, and display information related to the hierarchical groups. The user devices 102 may interact with the hierarchical communication system 108 by requesting and obtaining the aforementioned data via the network 130.

In some embodiments, users may utilize the user devices 102 to interact with the hierarchical communication system 108 by way of one or more software applications (i.e., client software) running on and/or accessed by the user devices, wherein the user devices 102 and the hierarchical communication system 108 may form a client-server relationship. For example, the user devices 102 may run dedicated mobile applications associated with the hierarchical communication system 108 and/or utilize one or more browser applications to access hierarchical communication channels (e.g., group chatting platforms) associated with the hierarchical communication system 108. In turn, the hierarchical communication system 108 may deliver information and content to the user devices 102 related to the user, the group in which the user is a member of, the other groups that are related to the user's group, for example, by way of one or more platforms which support communication between two users or among a plurality of users.

In some embodiments, the client software (i.e., software applications installed on the user devices 102) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

Other data platforms 104 may comprise servers and database systems that provide information or data related to the user or the environment in which the user may be located, such as the weather, news, emergency situations, alerts and the like. One or more data platforms 104 may provide user interfaces and/or open application programming interfaces via a communication module or through a variety of means.

Social network platforms 106 may comprise servers and databases that allow people to build social networks or social relations with other people who share similar personal or career interests, activities, backgrounds or real-life connections, or interests in certain types of products, and so on. Social network platforms may include socializing services which are primarily for socializing with existing friends, networking services which are primarily for non-social interpersonal communication and social navigation services which are primarily useful for searching for various resources relevant to one's social network. The hierarchical communication system 108 may interact with various types of social network platforms 106 to obtain relevant social connections of users who may be using the user devices 102. One or more social network platforms 106 may provide user interfaces and/or open application programming interfaces via a communication module or through a variety of means.

The network 130 may be a communication pathway between the hierarchical communication system 108 and the user devices 102, the e-commerce platforms 104, and the social network platforms 106. The network 130 may comprise any combination of local area and/or wide area networks using both wireless and/or wired communication systems. For example, the network 130 may include the Internet, as well as mobile telephone networks. In one embodiment, the network 130 uses standard communications technologies and/or protocols. Hence, the network 130 may include links using technologies such as Ethernet, 802.11, worldwide interoperability for microwave access (WiMAX), 2G/3G/4G mobile communications protocols, asynchronous transfer mode (ATM), InfiniBand, PCI Express Advanced Switching, etc. Other networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

Figure 2:
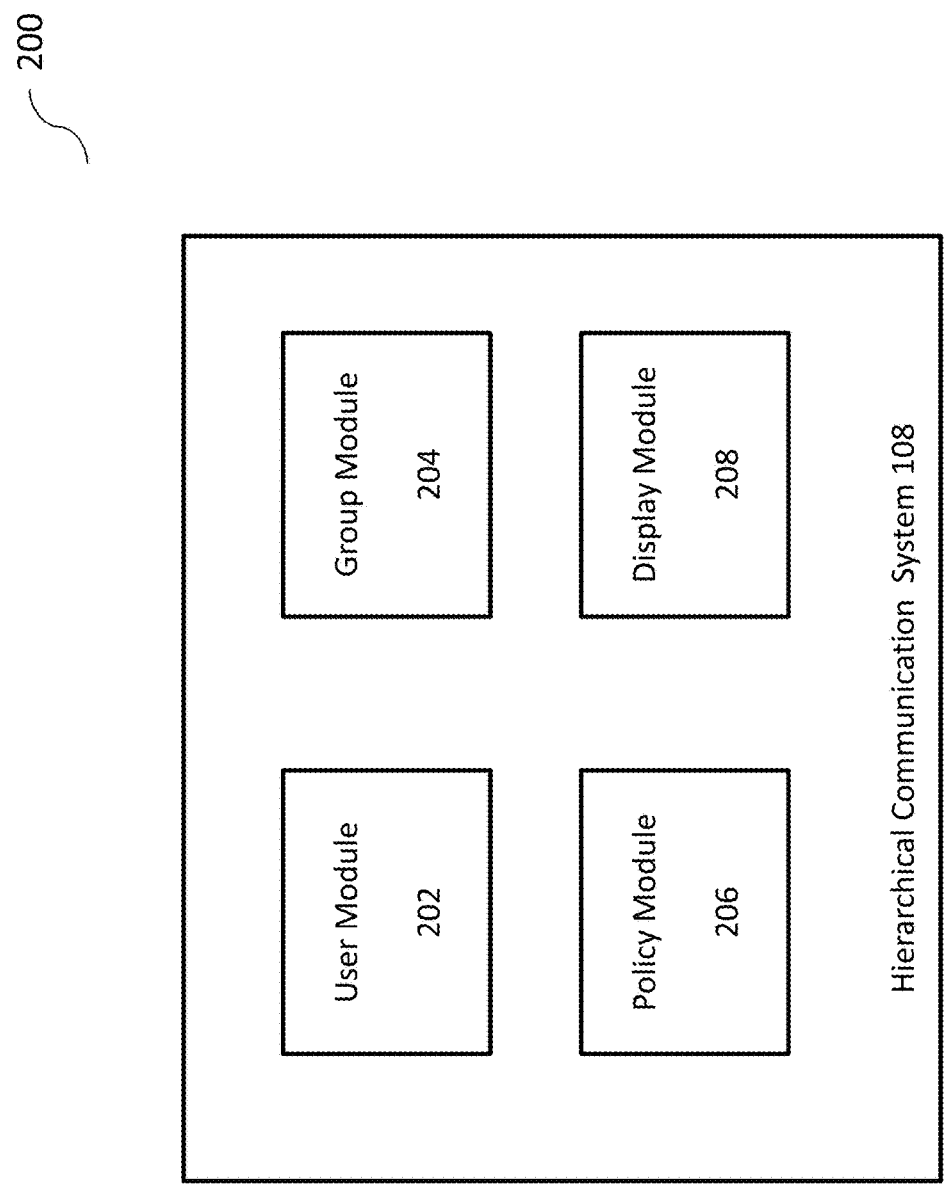
FIG. 2 illustrates a hierarchical communication system and its components in accordance with some embodiments.

FIG. 2 illustrates a block diagram 200 of a hierarchical communication system according to an embodiment. The hierarchical communication system 108 is configured to create, map, recommend, and establish connections between users and groups in the system, and configured to transmit and receive messages/texts/videos between users and among multiple users in a group and across multiple groups. The hierarchical communication system 108 can also provide various features for the users and groups, especially for coordinating and managing critical or time-sensitive tasks in real-time. The users and groups may be tiered and have relationships that are hierarchical. The hierarchical communication system 108 can include various components for performing the processes and features described herein. For example, in the illustrated embodiment, the hierarchical communication system 108 can include a user module 202, a group module 204, a policy module 206, and a display module 208.

These components of the hierarchical communication system 108 are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 2, the hierarchical communication system 108 can include more components or can combine the components into fewer components (such as a single component), as may be desirable for a particular implementation. One or more of the components can be implemented by a user device. The interactions among these components are illustrated in detail below.

Each component of the hierarchical communication system 108 may be implemented using one or more computing devices (e.g., server devices) including at least one processor executing instructions that cause the hierarchical communication system 108 to perform the processes described herein. The various components of the hierarchical communication system 108 listed above can be implemented by a single server device or across multiple server devices, as described above.

The user module 202 may be configured to manage user account and their associated information. The user module 202 may provide forms for setting up or creating individual accounts containing information about the user. User accounts may comprise a user profile, which can be used to store the description of the characteristics of a user. User profile may include information on the user's name, address, hobby, profile photo or video, profession, and other information which may be relevant to the user. The user profile may also include other content associated with the user such as, for example, connections to other users (e.g., list of the user's friends), media, various comments or log history of the user on the hierarchical communication system 108.

Furthemore, the user module 202 may be configured to collect the user's various biometric data. Biometric data or information may generally refer to herein as any information that may indicate the wellbeing or the health of the user. For example, various sensors that may be attached to or coupled to the user may be used in obtaining such information. Such sensors may include, for example, heart rate monitors, glucose monitors, and other devices or sensors which may measure a user's vital signs. The user module 202 may be configured such that the user's various health or wellness indicators are tracked periodically, especially when the other users on the hierarchical communication system 108 may be involved in a mission critical task or responding to emergency. In such situations, the wellbeing of the individuals in the group may be essential to continually monitor in order to best coordinate and manage the process.

The user module 202 may also be configured to send one or more requests for users to join the platform. The request may be sent by one user to other users on the hierarchical communication system 108 or those that are not yet part of the hierarchical communication system 108. The user interface for inviting others to the platform is also illustrated in FIGS. 6A-6D.

The group module 204 may be configured to manage group accounts and their associated information, including various group attributes and their relationships. A group in the hierarchical communication system 108 may be a collection of users. Each user in a group may be associated with one or more different types of roles, wherein the number of roles and the names for each role may be configured by one or more users. For example, each user in a group may be assigned to one of three roles, wherein the number of roles may be configurable by the hierarchical communication system 108. The communication system may be hierarchical (or tiered) in a sense that there may exist various levels among various groups of users and among different roles. For example, the group module 204 is configured to provide tiered groups or hierarchical groups for users, which is also illustrated in detail in FIG. 3.

In one embodiment, the three roles of users within a group may be given distinct categories or names, such as, 1) owners, 2) moderators, and 3) members of the group. The owners and moderators of a group may together be referred to herein as the "managers" of the group. Owners, moderators, and members of a group all together may be referred to herein as "insiders" of the group. The group module 204 may be configured such that members of a group can send messages to insiders and can see all group related information, including the relationships among different groups. Moderators may play a wide range of roles for the group. For example, the moderators can delete or modify messages/texts/videos, invite other users to join the group, delete one or more members, designate members to become moderators, or build relations with other groups (e.g., relations or tiers between any two groups or among three or more different types of groups). Owners may play a different role compared to moderators. The group module 204, for example, may be configured such that the owners may be configured to add/delete moderators, designate moderators or members to become owners, and perform other roles which include the role of moderators, for example.

The group module 204 may be configured to have at least four distinct types of group members. For example, the group members may be divided into: i) "broadcasters", who are allowed to broadcast messages to members within the group, wherein broadcasting may generally refer to sending or transmitting messages to two or more people; ii) "commenters", who are allowed to comment on messages sent to the group, wherein the comments can be seen by all insiders of the group (in some embodiments, the group module 204 may be configured such that the commenters are now allowed to broadcast messages; iii) "repliers", who are allowed to reply to messages, wherein the replied messages, for example, can only be seen by the authors of the replied messages (in some embodiments, the group module 204 may be configured such that the repliers are not allowed to comment or broadcast messages); and iv) "readers", who are allowed only to read messages (in some embodiments, the readers are not allowed to broadcast, reply, or comment on messages).

The group module 204 may also be configured to create dynamically generate groups. In some embodiments, the groups are created in real-time or near real-time. The creation of dynamic groups may be dependent on various information, including but not limited to user's personal information, user's device information, information or data on the environment surrounding the users, the user's social network data (e.g., data obtained from the social network platform 106). The specifics of how various groups are dynamically created may be further described in FIG. 5.

The policy module 206 may be configured to provide various policy and rules settings for the hierarchical communication platform 108, including but not limited to, privacy settings, access settings, authority settings, scope settings, which may be application to users and/or groups. For example, the policy module 206 may determine which groups may share information with other groups, and which specific individuals may perform certain actions or activities on the hierarchical communication platform 108. The policy module 206 may also be configured to determine the scope of visibility of any one or more information or data, including data or information on various groups or users, shared on the hierarchical communication system 108.

In some embodiments, the policy module may be configured to provide additional attributes that are associated with each user, each group, and the relationships among the users and the groups on the communication system 108. For example, each user may be assigned a role, and each role may be associated with various attributes (i.e., role attributes) which may be configurable by the user or the group members or an administrator of the system. The attributes may determine the scope, authority, visibility of various aspects of the hierarchical communication system 108. Other specifics of the various policies, rules, and controls settings may be further described in FIG. 5 and its related illustrations and descriptions. Each group may also be associated with a group attribute, and the group attribute may be configurable by the group administrator or group members, owners, or others in management of the group, to determine the scope, authority, visibility of various aspects of the users or data shared within the group.

The display module 208 may be configured to provide, generate, display, manipulate, and organize various information gathered from the hierarchical communication system 108 and its various components, including the user module 202, group module 204, and the policy module 206, and to present such information and data on users' mobile computing devices 102. The user interface may be of various display screen sizes. The display module 208 may be configured to provide a customized user interface for each type of mobile computing devices. The display module 208 may be configured to compute and present various user interfaces, which are also illustrated in FIGS. 6-11.

Figure 3:
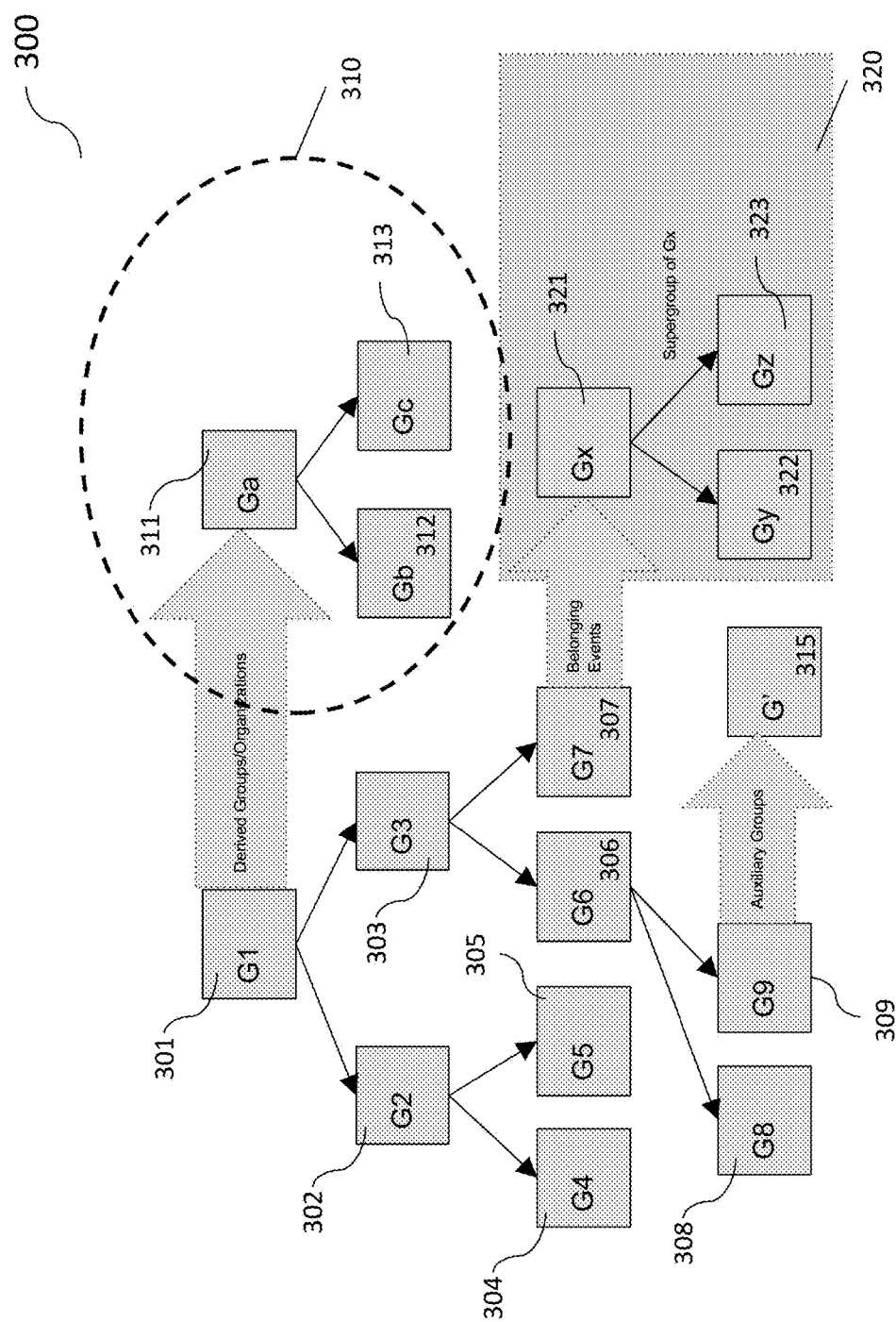
FIG. 3 illustrates a group structure provided by the hierarchical communication system in accordance with some embodiments.

FIG. 3 illustrates a group structure provided by the hierarchical communication system 108. For example, the groups 300 illustrated in FIG. 3 form a hierarchy, wherein each group may serve different roles and functionalities. The groups 300 may represent groups within one organization or across multiple organizations. In the given example, the groups G1 301 through G9 309 form a hierarchy, wherein group G1 301 is at the top of the hierarchy. For example, referring to FIG. 3, G1 301 may be referred to herein as a "level 0" group, wherein the lower the numerical value of the level, the higher in the hierarchy of groups. G2 302 and G3 303 may be referred to herein as "level 1" groups, whereas G4 304, G5 305, G6 306, and G7 307 may be "level 2" groups, and G8 308 and G9 309 may be "level 3" groups. The numerical values (e.g., "level 0", "level 1", etc.) of the different levels of group are for illustration purposes and maybe configured by the group module 204 in various configurations.

If all the "insiders" of G2 302 are also insiders of G1 301, G2 can be one of the subgroups 320 of G1 301, and group G1 301 can be called a super-group of G2 302. Referring to FIGS. 3, G2 302 and G3 303 are both subgroups of G1 301, and G4 304 and G5 305 are both subgroups of G2 302. If G1 has no super-groups (as illustrated herein), and we also assume that G2 has no subgroups (i.e., does not have G4 or G5), then G1 301 can be called a "direct" super-group of G2 and G2 can be called a "direct" subgroup of G1. A group may have multiple direct subgroups and multiple direct super-groups. For example, if Group A is a direct subgroup of group B, and group B is a direct subgroup of group C, group A may be referred to herein as "indirect" subgroup of group C. Direct subgroups and indirect subgroups may be collectively referred to herein as subgroups. Similarly, direct super-groups and indirect super-groups may be collectively referred to herein as super-groups. If a group has no super-group but has subgroups, the group may be referred to herein as "top" group. A "top" group and all its subgroups may form a hierarchy.

In another example, if the owners of group A can act as the owners of group B, and the moderators of group A can act as the moderators of group B, then group A may be referred to herein as a "superior" group of group B, and the group B may be referred to herein as "subordinate" group of group A. If there are no other groups which are "subordinate" groups of group A (besides group A itself), and there are also no other groups which are "superior" groups of group B (besides group B itself), group A can be called a "direct" superior group of group B, and group B can be called a direct subordinate group of group A. Any group can have multiple direct subordinate groups and multiple direct superior groups. If a user is an insider of group A, the user does not necessarily become an insider of group B. If group A is a direct subordinate group of group B, and group B is a direct subordinate group of group C, group A can be called an indirect subordinate group of group C. Direct subordinate groups and indirect subordinate groups may be collectively referred to herein as "subordinate" groups. Direct superior groups and indirect superior groups may be collectively referred to herein as "superior" groups. A superior group may not necessarily be a super-group, and a subordinate group may not necessarily be a subgroup.

In another example, the managers of group A can invite/request/determine group B to be a subordinate group of group A. The managers of group B can accept or reject the invitation. Once the invitation is accepted, the superior-subordinate relationship between group A and group B can be established.

A group can be called a "root" group if the group does not have any "superior" groups. A root group and its subordinate groups may form a hierarchy, which may also be referred to herein as an "organization", "hierarchical organization", and the like. For example, referring to FIG. 3, G1 301 may be called a "root" group, for the groups G1 301 through G9 309 (i.e., G1 301, G2 302, G3 303, G4 304, G5 305, G6 306, G7 307, G8 308, G9 309).

For example, a root group of an organization can be called "public" (i.e., does not have any "superior groups"), and its subordinate groups can be countries such as "USA", "China", "Canada", "France", "Russia", etc. The subordinate groups of one country can be the states or provinces. For example, the subordinate groups of "USA" can be "California", "Texas", "New York", etc. The subgroups of one state can be the counties. For example, the subordinate groups of "California" are "Santa Clara county", "San Mateo County", "Alameda County", "San Francisco County", etc. The subordinate groups of one county are the cities. For example, the subordinate groups of "Santa Clara county" are "Sunnyvale city", "Cupertino city", "San Jose city", and the like. Each user of the organization is the insider of at least one group. All the groups in this organization may also be called "local groups" because they are location based groups.

In some instances, a "virtual group" may be created, wherein the virtual group is a group with no users as "members". For example, a group named "San Francisco bay area" can be referred to herein as a "virtual group" which has "Santa Clara county", "San Mateo county", "San Francisco county", etc as its subordinate groups.

In another example, if all the insiders of group A and group A's subordinate groups are all insiders of group B and its subordinate groups, group A can be referred to herein as a "derived" group of group B, and group B may be called a "deriving" group of group A. A group can have multiple derived groups and multiple deriving groups. For example, referring to FIG. 3, groups Ga 311, Gb, 312, and Gc 313 (collectively referred to herein as "derived group" 310), are derived groups of G1 301. If a group has no deriving groups and only has derived groups, then it may be referred to herein as an "original" group. An original group and its derived groups may form a hierarchy.

For example, an event (organized by one or more organizations) may be treated as a derived "group" of an organization. An event may be created by providing additional number of group attributes, including location, start time, and end time. An event may have subordinate groups and subgroups. An event may be dynamically created and may be a temporary group, which may only last a short period of time. The group module 204 may be configured such events may share all functionalities of a group. After the event has expired or ended, the group that corresponds to that specific event may be deleted or alternatively archived/kept within the group structure.

In some examples, a group can have "belonging" events as an attribute. Group A may be referred to herein as a "belonging" event of group B if group A is an event and group A is the derived group of group B. For example, referring to FIG. 3, Gx 321 can be a "belonging" event of G7 307, wherein Gx has Gy 322 and Gz 323 as subgroups. An insider of a group can create a "belonging" event. After created, the user who may be the creator and owner of the event can send invitations to other insiders of the "belonging" group and the subordinate groups of the belonging group. If any of the insiders accept the invitation, for example, he/she may become a member of the event.

In some examples, a group can have belonging "auxiliary" groups. Group A may be an "auxiliary" group of group B if: the owners of group A are insiders of group B, and the group A is i) not a subordinate group or an indirect subordinate group of group B, ii) the superior groups of group B, or iii) the indirect superior groups of group B. In FIG. 3, G' 315 may be an auxiliary group of G9 309. The managers of group B, for example, can send invitations to group A to invite group A to be an auxiliary group of group B. The managers of group A can accept or reject the invitations. If accepted, the superior-auxiliary relationship between group B and group A may be established.

The group module 204 may be configured to manage the various aforementioned types of relationships between any two groups, and also the various different types or groups, including "events", which may require additional attributes to be provided. In the hierarchical communication system 108, the various types of relationships among groups may include: subgroups, super-groups, subordinate groups, superior groups, derived groups, deriving groups, auxiliary groups, events, and the like. All the aforementioned concepts are utilized to build relations between and among different groups. For example, the members of an auxiliary group may have no right or have no authority (e.g., not given access) to communicate or send/receive messages to anyone in the superior group, except a member of the superior group who had previously been invited. The members of a superior group can invite the members of its subordinate groups, for example, to join a derived group without receiving authorization from other members of the group. On the other hand, the members of a subordinate group can invite the members of its superior groups to join a derived group, but may need the approval of other members.

In application of the group structures and relationships provided by the group module 204, one example can be an application to various organizations, such as political organizations. Each political organization, for example, may be considered a "derived" organization of one local group. For example, the Republican party may be considered a derived organization of the local group called "USA". The party itself is an organization which is hierarchical in nature. The subordinate groups of the root group an organization can include various groups such as "California republicans", "Texas republicans", "New York Republicans", etc. The subordinate groups of "California republicans" are "Santa Clara county republicans", "San Mateo county republicans", etc. The subordinate groups of the "Santa Clara County" are "Sunnyvale republicans", "Cupertino republicans", etc. The subordinate groups of "California republicans", on the other hand, can be the "first election district republicans", "second election district republicans", etc. In addition, the event "Sunnyvale republican year 2017 parade" can be one of the "belonging events" of the group "Sunnyvale republicans". The event "New York city 2018 independent day firework celebration" can be one of the belonging events of the local group "New York city".

Figure 4:
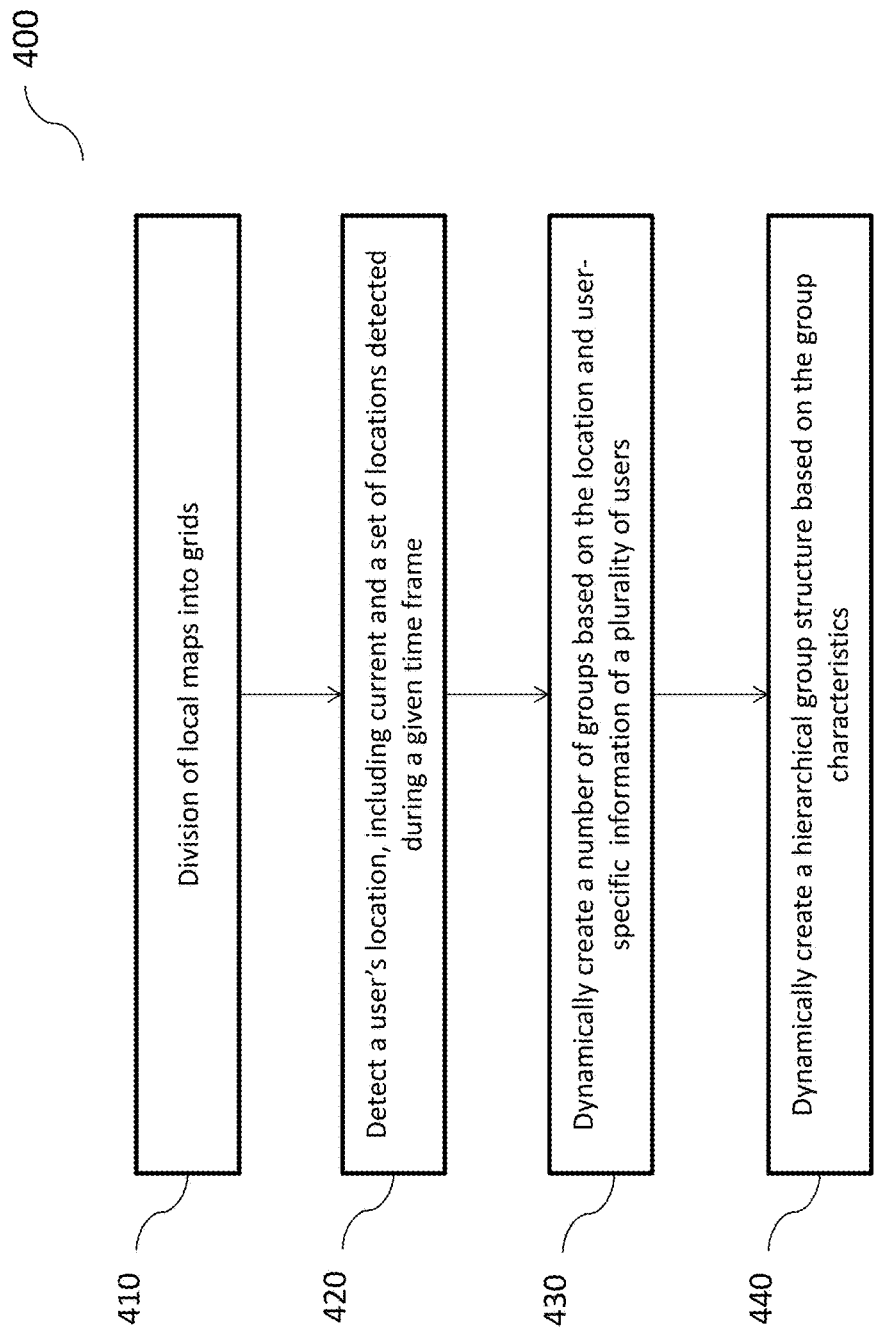
FIG. 4 illustrates a flow chart of dynamic group creation in accordance with some embodiments.

FIG. 4 illustrates a flow chart 400 of dynamic group creation according to an embodiment. The hierarchical communication system 108 can create various dynamic groups, in real-time or near real-time. For example, the hierarchical communication system 108 can be configured to create city groups, state groups, and country groups, automatically, based at least on the geographic locations of the users and the user devices 102. The hierarchical communication system 108 may also be configured to create dynamic groups based on the user information, including the user's preferences and background. For example, the hierarchical communication system 108 can create groups based on the users' age, sex, location, languages, professions, careers, interests, hobbies, political preferences In some embodiments, the hierarchical system 108 may divide regions on a map into grids (operation 410). Each grid may be a rectangle, or any other shapes that may be specifically configured according to the specific region. The collection of such grids may also be referred to herein as "grid tables". Each city, state, and country may occupy the various grids which have been created by the hierarchical communication system 108. Such grids may then be superimposed or overlay on top of a map data which includes the border lines and division lines for each city, state, and country. For each user, the system 108 may then be configured to derive the residing/occupying grid for each city, state, and country. The system 108 may then dynamically create a group for each city, each state, and each country. For example, every user in the system 108 may be put automatically into multiple city groups (e.g., three) based on the user's current location, residential location, and work location.

Next, in order to detect the location of the user (operation 420), the hierarchical communication system 108 may be in communication with the user devices 102. The user's location may be detected based on one or more sensors. The one or more sensors may include sensors onboard the user devices 102 (e.g., GPS) or may be sensors that are coupled to the user devices 102, including external GPS devices and the like. In some instances, the location may be measured during a given period of time (e.g., weekly, monthly, etc.), or only noted when there's a significant change in the location of the user. For example, every time when a user device 102*a* has a significant change in location, the user device 102*a* can transmit the current location to the hierarchical communication system 108. The system 108 may then record the location on the grid table. The grid size can be 1 mile, 2 miles, 3 miles, 5 miles, 10 miles, 20 miles, and the like. The system 108 may be configured to adjust the size of the grid based on the specific task at hand.

The user's work location and residential location may be detected based on the following procedure. For example, every day or at a certain time interval (e.g., every night time period), which may be 8 pm through 6 am, the hierarchical communication system 108 may transmit GPS location requests to the user devices 102. The user devices 102 may report the current GPS location to the system 108. After one week, one month, or after a set time interval, the system 108 can compare the multiple locations detected during that period of time. If more than half of all locations are in the same city, according to the collected data, the city may be treated as the residential location of the user. The user may dynamically be added (operation 430) as a member of the city group. Every day, during the day time period, for example LOAM through 5 PM), the system 108 may send requests to the user devices 102 every hour or at every time interval. The user devices 102 may report the current GPS location to the system 108. After one week, two weeks, three weeks, or a month, two months, three months, or any other set time interval, the system 108 can compare the multiple detected locations. If more than half the locations are in the same city, the city may be treated as the work location of the user. The user may dynamically be added as a member of the city group (operation 430). Furthermore, based on the city, county, and other relationships among the different locations that are grouped, the various dynamically created groups can form a hierarchy of groups (operation 440), for communication purposes, as described in FIG. 2.

In another embodiment, dynamic groups may be created based on the languages or other user information that is obtained by the hierarchical communication system 108. For example, if user A is using Chinese, and user B is also using Chinese, the two users may be dynamically put into the same group called "X city Chinese Group", wherein both users are living city "X". Such dynamic grouping may be accomplished as follows: from the user device 102*a*, when a user may be using the user device, the user device can detect which language is configured in the system of the user device 102*a*, or the user device may be configured to automatically detect the language used by the user based on the user interface inputs (e.g., detecting typing in Chinese). Every day, for example, at a set time, the system 108 may be configured to detect the languages used on the user device 102*a*. Whichever language is detected more than half the time, the language may be considered as the main language or the "native" language of the user. Alternatively, the hierarchical communication system 108 may also be configured to detect whether a certain number of people (e.g., beyond 100 or 500) are using the same language in one city. Then, the system may dynamically create a new city group, state group, or country group for the users who share the same language. For example, "X city Y language group", may be groups created by the system 108. The new group's attribute (i.e., "language") may be set to be the language predominantly used by the group members. These groups may be considered to be "derived" groups of the original city groups, state groups, and country groups.

In another embodiment, dynamic groups can be based on the user's profession or the user's main industry. For example, users may be requested to provide their profession or industry when signing up. For example, when a user inputs his/her working industry as "restaurant industry", the hierarchical communication system 108 may create a group called "restaurant", and the user can automatically be added to the group as one of the members. When other users also input the same information, they may also be automatically included in this group. These users in the same group can chat to each other on the hierarchical communication channel (i.e., platform) so to share data, discuss concerns or exchange opinions. For another example, when a user inputs his hobby as "fishing", a group called "fishing" can be created and the user may be included into the group automatically as a member. Other users who also share the same hobby may are also be included into the same group as members. The other users can also communicate within the group by being a member of the group on the hierarchical communication platform. These groups may also be managed according to the various roles that the users play in the group. For example, the "managers" of each group, as defined in the disclosure, can set their groups to be more secure such that all messages, including but not limited to, text, photos, videos, and attachments which are posted in their respective groups be encrypted during the transmission and storage of such information or data. The encryption/decryption methods may be any one or more algorithms which are well-known in the art.

In other embodiments, the users can create new dynamic groups by inviting other people from his/her contact list or other social networks that he or she may be part of, or any other users on the hierarchical communication channel, and the like. For example, a user may desire to host a lunch for the upcoming Sunday, and he/she may invite friends from his/her contact list, and may also include those who do not belong to the church group that he or she is part of. For all the invitees who responds to the invitation in the affirmative, the system 108 may be configured to add those invitees to a new dynamic group called, for example, "Sunday Potluck Lunch" group. Such dynamically created groups may be temporary, in a sense that they disappear after the event has concluded, or the system may be configured to transition the group into a "permanent" group, if certain number of people would like to keep the group as a permanent group, for example.

FIG. 5 illustrates a group attribute, policy and control setting for the hierarchical communication system 108. In one embodiment, for each group, five or more attributes may be configured, including the following: i) "potential applicants": this attribute may define who, among the users, are allowed to apply to join the group; ii) "friend groups or visitors": this attribute may define who are allowed to see and search the insiders of the group, and also defines who are allowed to invite the insiders of the group to join other groups; iii) "pre-approved potential applicants": this attribute may define those users who are allowed to join the existing group without approval; iv) "pre-accepted inviters": this attribute may define users who are allowed to invite the insiders of the current group to join other groups and may be automatically accepted; v) "approvers": this attribute may define the users who can be the approvers who are allowed to approve the applications of those who are wishing to join the group. Each attributes may have various values assigned to it, and each value may include one or more fields. For example, each value may include two fields: "inherit" and "list". Field "inherit", can have two settings: yes and no. If set as a "yes", then this means that the group can inherit the settings from superior groups. The field "list" can be set to zero, or one or more group descriptions. Each group description may include: 1) a group display ID; 2) a combination of roles (owners, moderators, and members); 3) a combination of scopes (e.g., self-subordinate groups, superior groups, and auxiliary groups), and the like.

Each group may also have one or more attributes called group visibility scope. In one embodiment, there can be six levels of visibilities: open, public, corporate, hierarchical, private, secret. For example, the name of "corporate" group can be seen and searched by any user in the same organization. The insiders of the "corporate" group can be seen, searched, and invited by any users in the same organization. FIG. 5 may represent the database that may be maintained by the hierarchical communication system 108, and by the policy module 206. The first column 510 may represent the six levels of visibility (visible scope 511), including open 512, public 513, corporate 514, hierarchical 515, private 516, secret/hidden/closed 517. The second column 520 may represent other groups which can do name search or apply to join the group 521, given the visibility scope of the given group, which we may call group A, for example. The third column 530 may represent groups who can do member search for the given group (e.g. group A), and invite members of group A to join other groups, given the visible scope of the group A 531. For example, with visible scope of "open", any "public" groups 522 (e.g., defined with a description of {id: public, roles: [owners, moderators, members], scopes: [self]} 522) can do name search or apply to join group A, and any public group can do member search of group A and invite members to join other groups 532. For particular groups with "public" visibility, any other public groups 523 may also do name search or apply to join the group, and other "Org" groups as defined in 533 (e.g., Org={id: corporate, roles: [owners, moderators, members], scopes: [self, subordinate groups]}) may do member search of group A and invite members to join other groups. For a visible scope of "corporate", "Org Extension" with description list of {id: corporate, roles: [owners, moderators, members], scopes: [self, subordinate groups, auxiliary groups]} 524, can do name search or apply to join the group, and any "Org" groups as defined herein may do member search and invite members to join other groups 534. For a group with visible scope of "hierarchical" any other "Org" group can do name search or apply to join the group 525, and any other "hierarchy" group (e.g., Hierarchy={id: corporate, roles: [owners, moderators, members], scopes: [self, subordinate groups, superior groups]} 535) can do member search or invite members join other groups. For a group with visible scope of "private", an "Org" group may do name search or apply to join the given group 526, and any "group" with a description given in FIG. 5 (e.g., Group={id: self, roles: [owners, moderators, members], scopes: [self]} 536) can either do name search or apply to join the group 527 or can do member search or invite members to join other groups 537.

The database or table described in FIG. 5 is a non-limiting example, and there are many other ways to define the scope of visibility and various other group attributes. In some embodiments, various levels of access may be defined in a customized way. For example, in one organization, one user can see all group names and group members. In another example, in one organization, one user in one group can invite another user in the same or different group to join the group without acceptance. One user in one group can apply to join another group without approval. In another example, in one organization, one owner or moderator of one group can invite another user in the same group or in the subordinate groups to join a third group without acceptance. One user in one organization can be invited by another user in another organization to join one group in the second org by asking acceptance. One group can be "secret", which means the name and all its members cannot be seen by other groups even the groups in the same org. One group can specify another group as the application approver, and specify a third group as the potential applicants. For example, in a school, there is a group called "parents" which can specify the group "students" as the application approver and the group "citizens of X city" as the potential applicants. It means the potential parents should be living in the X city.

Figures 6A, 6B:
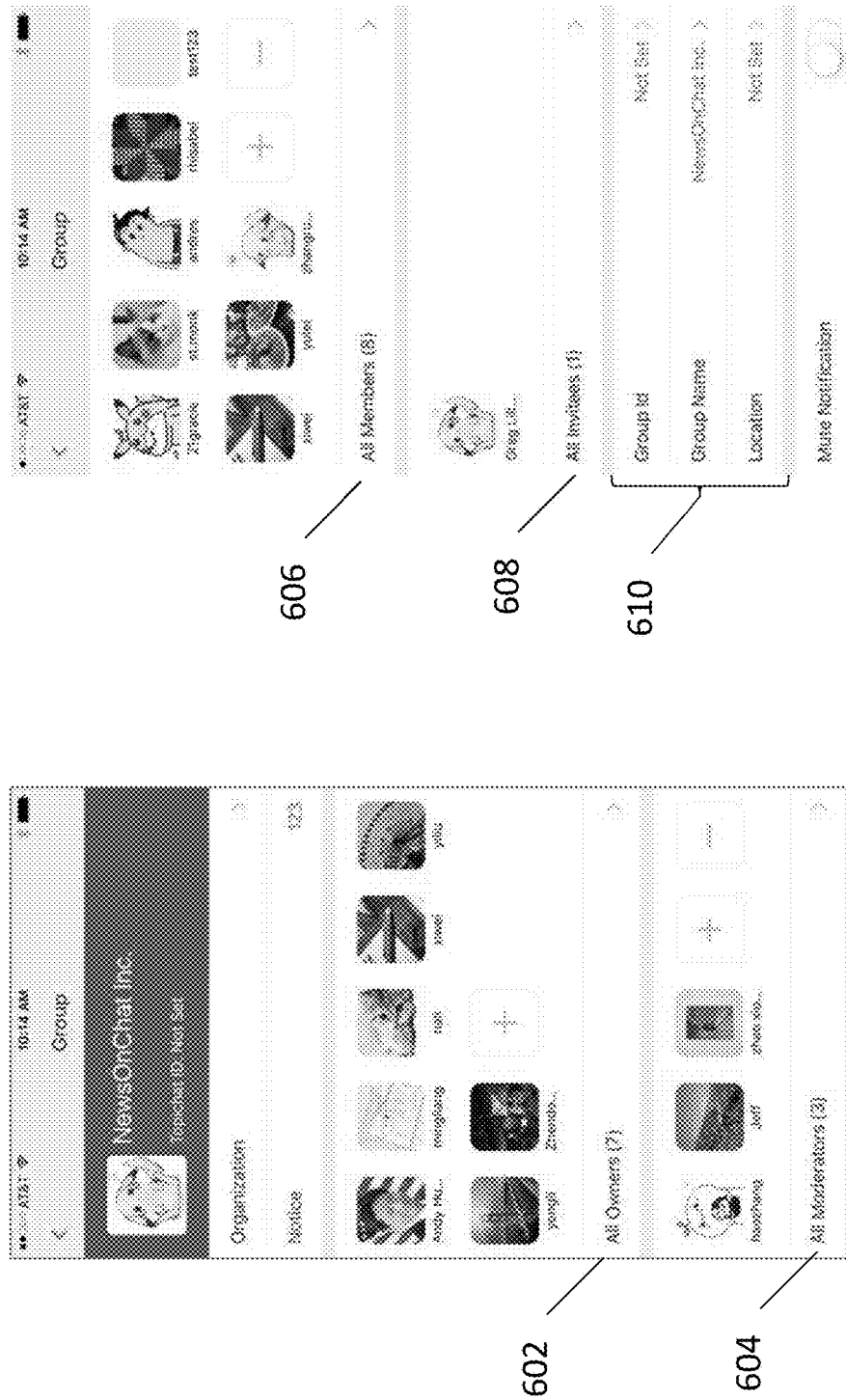
FIGS. 6A-D each illustrate a user interface for providing a hierarchical communication channel with groups in accordance with some embodiments.
Figure 6D:
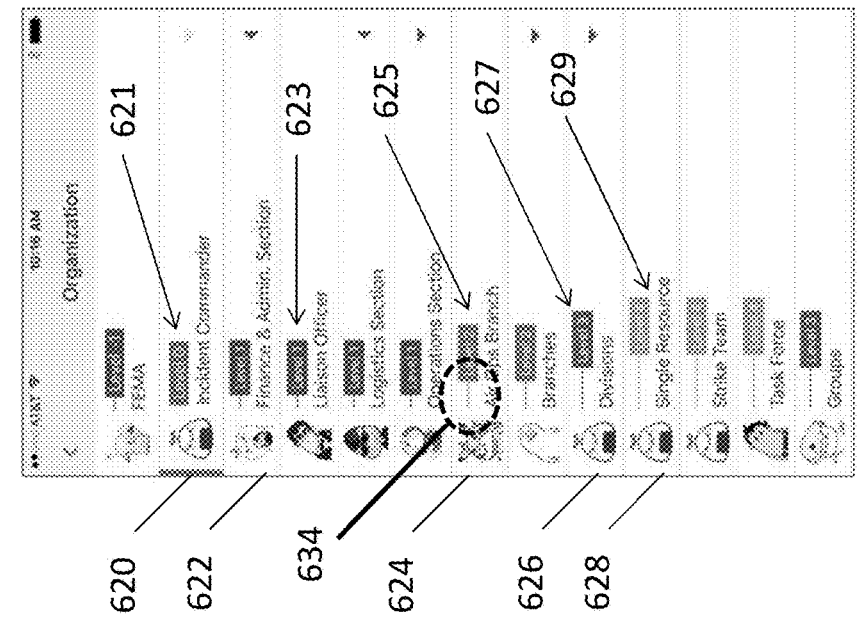
Figure 6C:
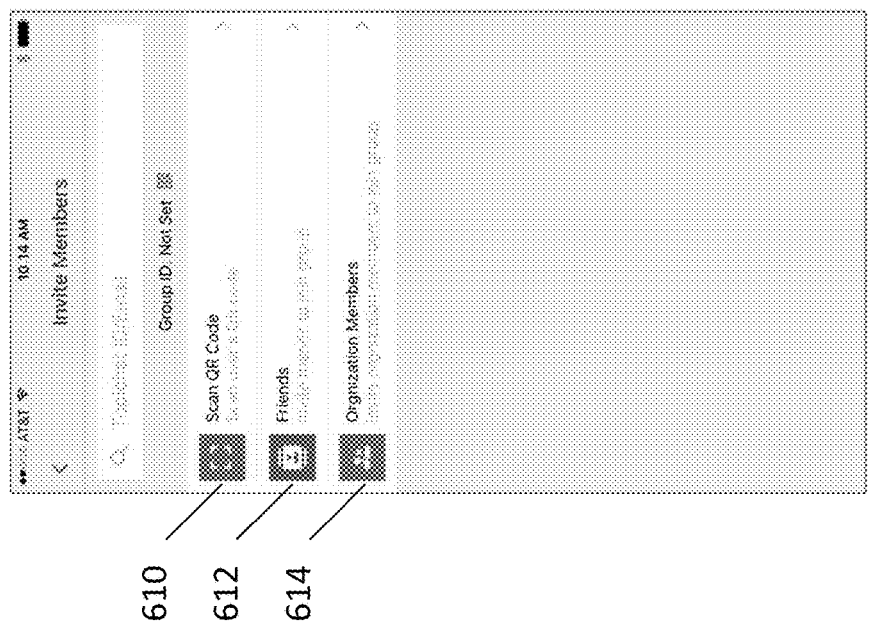

FIGS. 6A-D each illustrate user interface for viewing groups and various hierarchical communication channel components according to some embodiments. In some embodiments, the hierarchical communication system 108 may be configured to provide user interfaces for the management and creation of groups for the purposes of hierarchical communication. As illustrated in FIGS. 6A-6B, the user interface on the user devices 102 may be configured to present the organizations and the groups that the user may be associated with. For example, in FIG. 6A, the user interface may be configured to provide the user with various information regarding the organization and the group, including all the owners 602 and all the moderators 604. FIG. 6B may also illustrates the user interface which may be configured to provide additional information on a given group that a user may be part of, including all the members 606, all invitees 608, and group descriptions 610, including the group ID, group name, and location, for example. FIG. 6C illustrates a user interface providing various options for the user to invite others to the group or to the hierarchical communication system 108. For example, the user may scan a QR code 610, or invite existing friends 612 (those whom may be part of different social networks for example), or other members within the organization or other organizations 614.

FIG. 6D illustrates a user interface for providing a hierarchical or tiered display of users who are part of hierarchical communication system 108. For example, the organization may have multiple levels of rankings, from the Level 0 personnel (top of the hierarchy) to the Level 4 personnel (lowest in the given example). Referring to FIG. 6D, the incident commanded is a Level 0 personnel 620, and therefore has a label with "Level 0" 621. Finance & Admin Section 622 or the Liaison Officer may be Level 1, and therefore the label with "Level 1" 623 may be displayed, and the label may also include an indication (e.g., a line pointing out to the left of the label or an indentation), which differentiates the label from the "Level 0" label. The Air Ops Branch 624, for example, may be level 2, indicated by the label "Level 2" 625, and the label may be differentiated by a further indentation or by the length of the line that points out from the left of the label 634. The Divisions 626 may be a level 3 group, which is also indicated by the label "Level 3" 627. The label may be further indented compared to other higher level groups. Single Resource 628 may be a level 4 group, as also indicated by the label "Level 4" 629, and the further indented label.

Figures 7A, 7B, 7C:
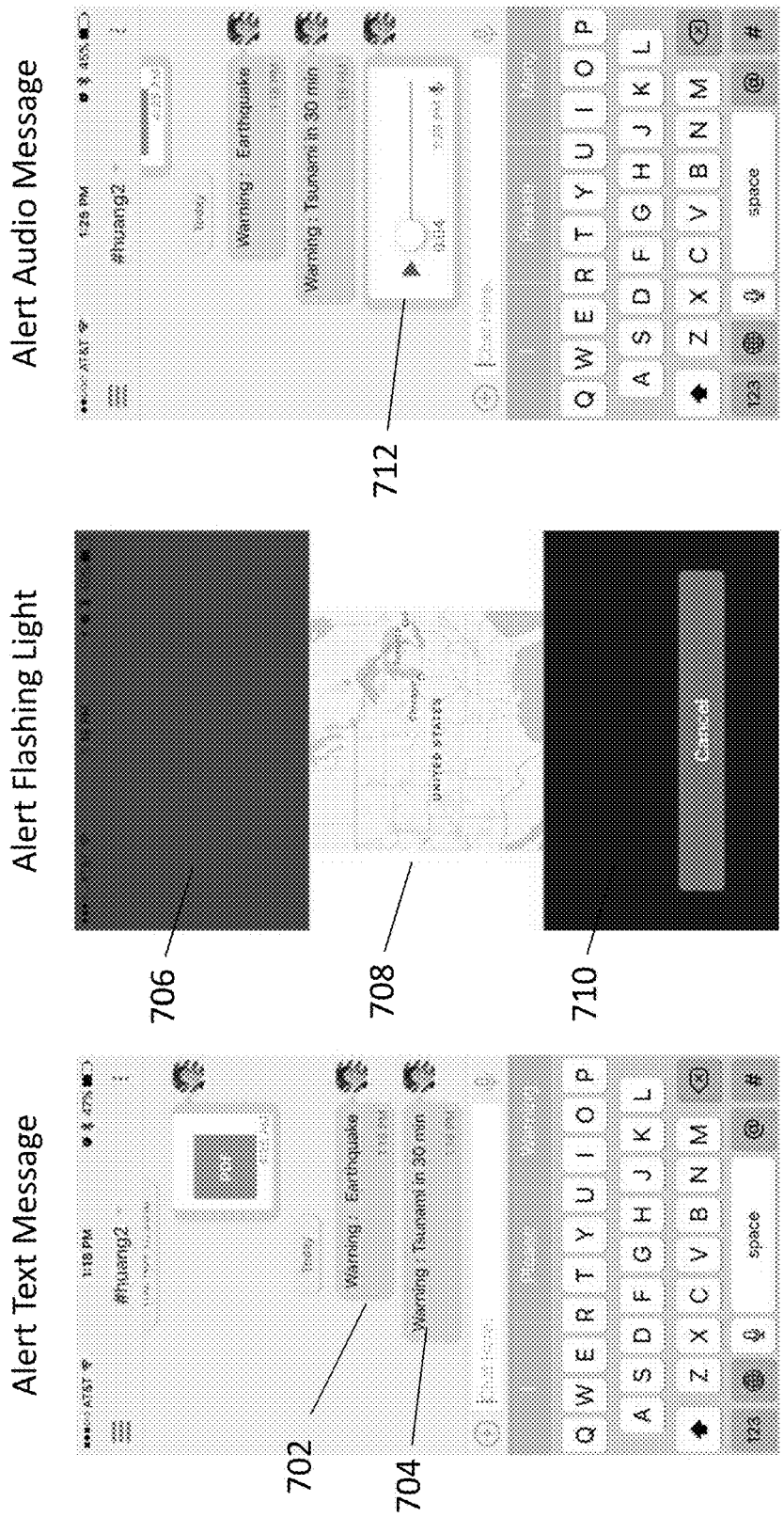
FIGS. 7A-C each illustrate a user interface for presenting various alerts in accordance with some embodiments.

FIGS. 7A-C each illustrate a user interface for presenting various alerts according to some embodiments. FIG. 7A illustrates a user interface that provides alert text messages on the hierarchical communication channels with various types of warnings (e.g., text message "Warning: Earthquake" 702 and "Warning: Tsunami in 30 min" 704), which may include descriptions and other information related to the emergency situation. FIG. 7B illustrates a visual method of alerting the users on the hierarchical communication system 108 with various color codes or gradients or colors (706 and 710), along with a visualization on a map of where the emergency situation may be occurring 708. FIG. 7C illustrates an alert audio message 712, as opposed to a text message, which may alert the users with audio signals, instead of message or visual, which may be useful for those who are visually impaired.

Figure 8B:
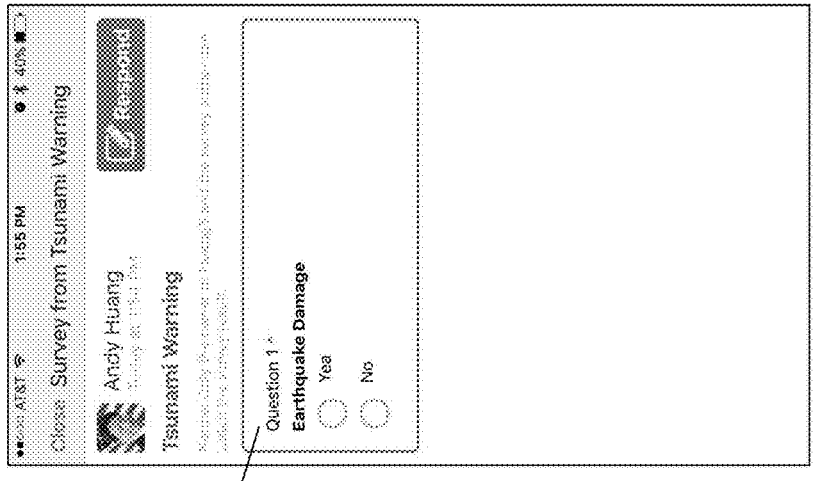
FIGS. 8A-B each illustrate a user interface for emergency response in accordance with some embodiments.
Figure 8A:
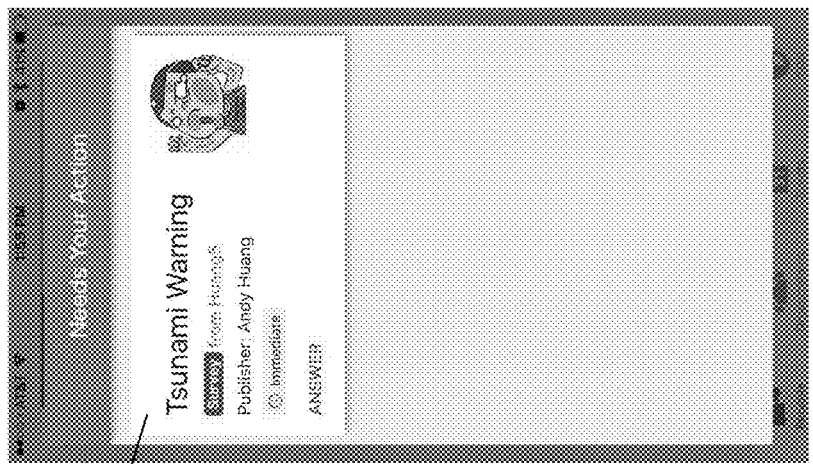

FIGS. 8A-B each illustrate a user interface for providing emergency response according to some embodiments. When an emergency situation arises, one or more of the users on the hierarchical communication system 108 may be able to publish, broadcast, or send messages regarding the situation (e.g., Tsunami warning 802), which may also indicate the name of the publisher and the like. The user may then be prompted to take a survey to fill out the situation, which may be collected for others' references. The survey may be given as in FIG. 8B, with a list of questions 804, and a requested response.

Figure 9B:
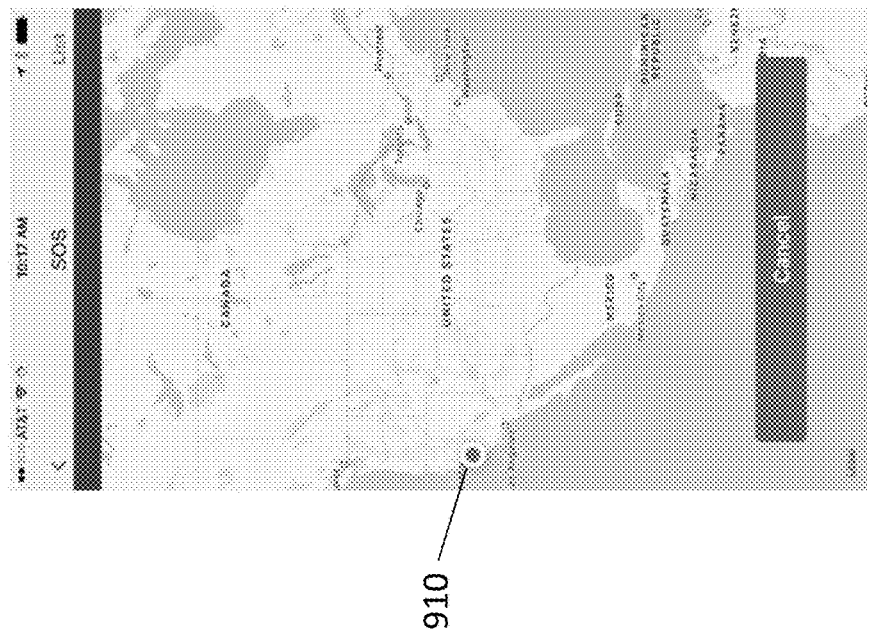
FIGS. 9A-B each illustrate a user interface for providing distress signals in accordance with some embodiments.
Figure 9A:
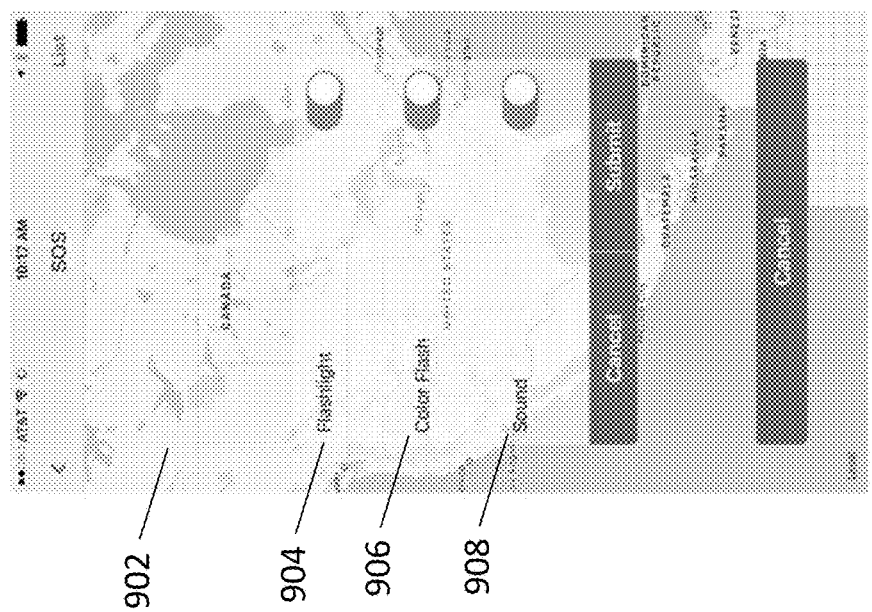

FIGS. 9A-B each illustrate a user interface for requesting SOS or one or more forms of distress signals according to some embodiments. In one embodiment, the user interface may provide various means for the user to request a distress signal in various circumstances. For example, as illustrated in FIG. 9A, the use may be given an option to provide one's location 902, and submit a request to generate a distress signal which may be displayed in a form of flashlights 904, color flashes 906, or sound 908. When the user submits the request, the user interface may then be configured to respond based on the user's selection of the type of distress signal requested. FIG. 9B shows the location of the user where he or she is sending the distress signal, and this may also be viewable by others in the system 108 or others in the group. For example, the managers of a group can monitor the GPS locations of all members and all insiders, especially when a distress signal is turned on. When the distress signal using a sound is turned on, the user device 102a may generate a sound that can alert others in the neighborhood. Alternatively, the members or users within a group may receive sound signals.

For example, in emergency or critical situations, the hierarchical communication system 108 may be configured for the user to alert the user's own emergency situation by, for example, highlighting the user's GPS location, flashing multiple available lights in various colors for user, and/or generating audible sound (e.g., emergency sirens) in various tones and/or tempo for user. The system may also be configured for the user to alert other people and/or user of an emergency situation around a designated location, alert other user by flashing multiple available lights in various colors, and/or alert other users by generating sound that may be indicative of emergency situations in various tones/tempo for other user.

Figure 10B:
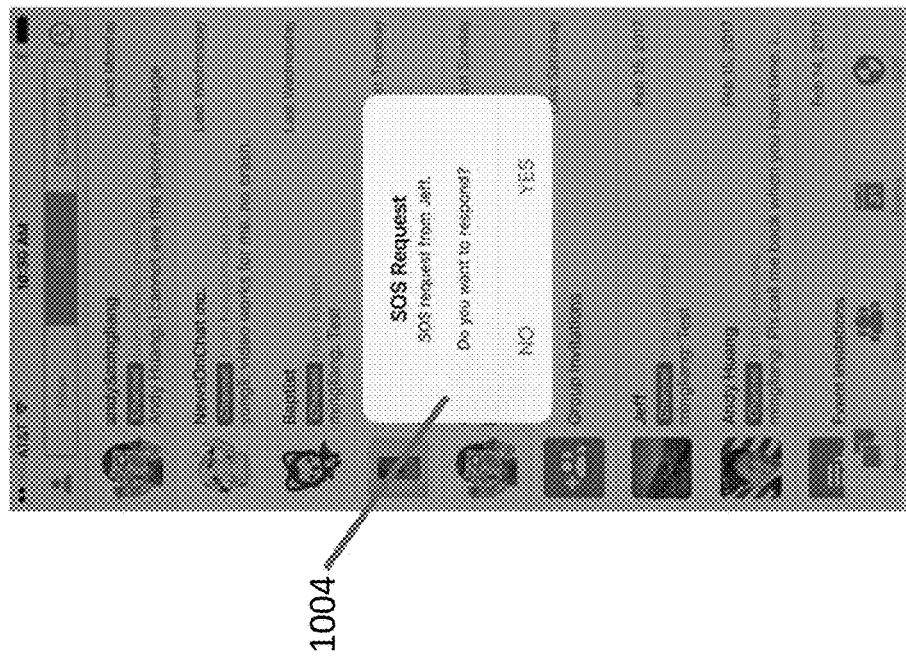
FIGS. 10A-B each illustrate a user interface for requesting safety check in accordance with some embodiments.
Figure 10A:
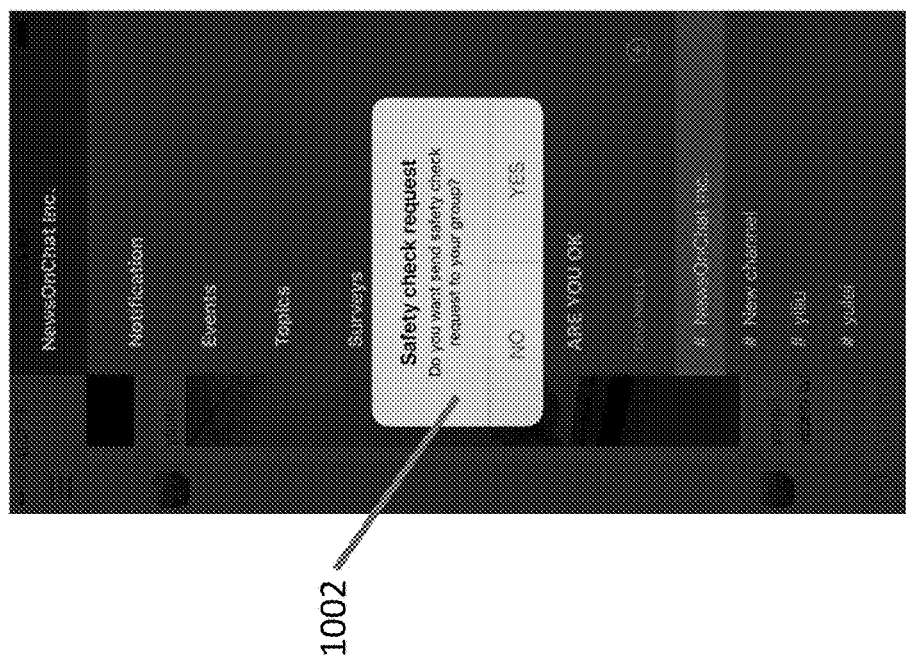

FIGS. 10A-B each illustrate a user interface for requesting safety check according to some embodiments. FIG. 10A illustrates a safety check request, which may be sent by one or more users of the hierarchical communication system. The safety check request may be sent via the user devices, by touching or tapping on a graphical element on the user display. In emergency situations, for example, a manager/owner/member of a group may be interested in the well-being of the other group members. The manager of the group may then send a safety check request to all members of the group via his or her user device 102a. The user interface may provide the managers with an option to send safety check requests 1002, and all members or insiders of the group may receive the request sent by the manager, which is also illustrated in FIG. 10B as a request to respond 1004.

Additionally, the managers of each group (or any other users) may send a special message to all members or insiders, which relate to the health or wellness of the other members. After the message is received by the user devices, for example, the mobile application resident on the user devices may pop up a message to ask confirm the health, welfare, or safety of the user. The message may be sent periodically or once. The recipient can answer the query directly or provide other means for feedback, including generating sounds and visual effects on the sender's user interface, for example.

Figures 11A, 11B, 11C:
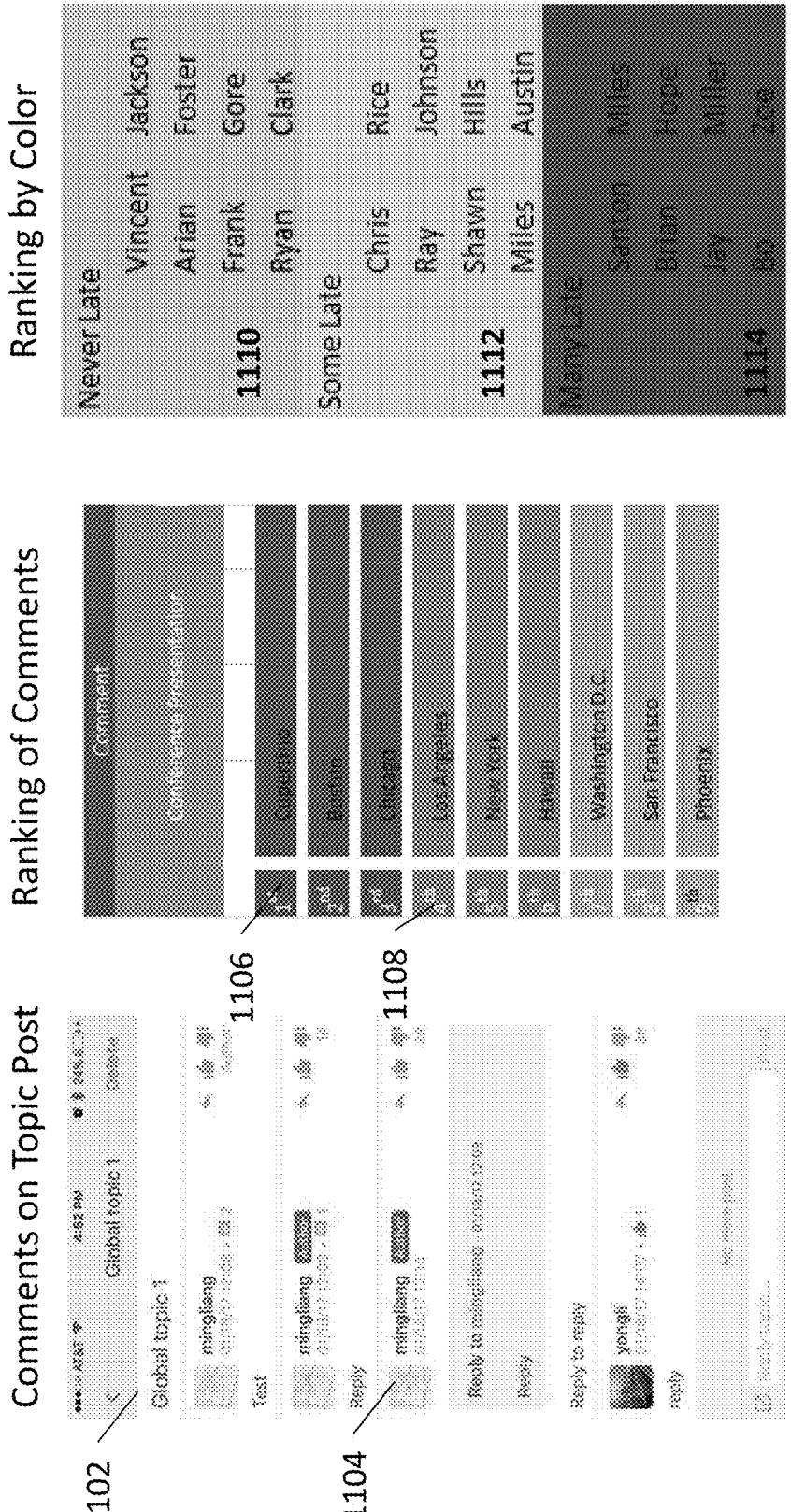
FIGS. 11A-C each illustrate a user interface for providing information on comments in accordance with some embodiments.

FIGS. 11A-C each illustrate a user interface for providing information on comments or provide feedback on various issues according to some embodiments. FIG. 11A illustrates the list of topics 1102, including the comments and replies 1104 to the comments. The comments may also be ranked, as illustrated by FIG. 11B, wherein the user may select the comments/topics/answers/responses to rank first 1106 or rank lower 1108. In other embodiments, the ranking may also be displayed in a form of color-coded method, as illustrated in FIG. 11C. For example, the user interface of FIG. 11C may be configured to present rankings or categories or comments/feedbacks in various color-coded formats or color gradients. The users or members of groups may rank any issues or items that are critical for their organization or group. For example, user may also review various financial metrics that are relevant to the organization, the group, or the users, such as bills and invoices, including but not limited to, utility (gas, electric, water, sewer, garbage-collection, telephone, etc.), financial institution (credit-card/mortgage/rent/lease/car, etc.), insurance (health/car/home, etc.), government (tax/student-loan, etc.), personal (loan/invoice, etc.) etc., to pay various bills, and to send bills/invoices to other users. The hierarchical communication system 108 and the user interface may be configured such that the bill/invoice owner can provide feedback on payee (e.g., feedback on the timeliness of payment of bills, or the system may be configured to provide options to update the user's profile/rating indicating on-time-payment, periodic delay of payment, or frequent delay of payments. Furthermore, the system disclosed herein may also be configured to display the user's accumulated feedback from his/her bill owner in various color/rating/numeric form, where the feedback or rating; for example, as illustrated in FIG. 11C, a feedback of "red/late/3" or "many late" 1114 may be for frequent delay of payment, and "yellow/fair/2" or "some late" 1112 may indicate periodic delay of payment, and "green/good/1" or "never late" 1110 may indicate on time payment.

Computer Control Systems

Figure 12:
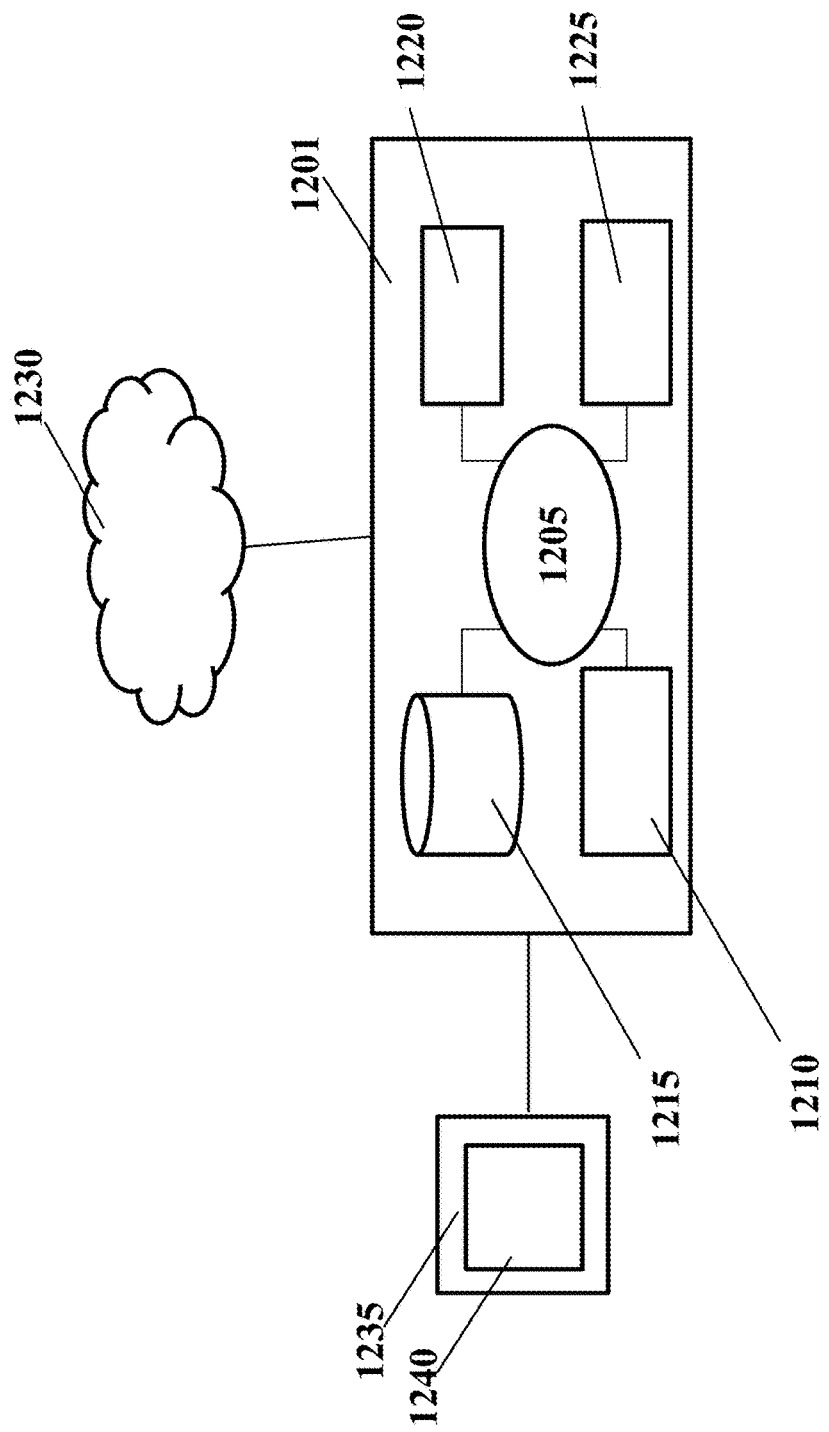
FIG. 12 illustrates example computer architecture applicable to any computer system described herein.

The present disclosure provides computer control systems that are programmed to implement methods of the disclosure. FIG. 12 illustrates example computer architecture applicable to any computer system described herein, including user devices 102 and any one or more server systems and related databases that may support the hierarchical communication system. For example, FIG. 12 shows a computer system 1201 that is programmed or otherwise configured to provide a hierarchical communication channel for various organizations to manage critical tasks and related communications. The computer system 1201 can regulate various aspects of FIGS. 1-11 of the present disclosure, such as, for example, the hierarchical communication system 108, user devices 102, and flow charts and databases illustrated in FIGS. 3-4.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user or a participating platform (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, displaying the hierarchical communication channels, platforms, various groups and members who are part of the groups, hierarchy or tiers of groups, visual display of the hierarchy of various groups via graphical elements (e.g., bars with varying lengths), distress signals, vital signs or other health metrics of the user, other messages/texts/videos that are shared on the platform. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. For example, some embodiments use the algorithm illustrated in FIG. 2 or other algorithms provided in the associated descriptions. Other embodiments may use algorithms similar to those illustrated in FIGS. 1-5 and its associated descriptions.

Example: Disaster Response Organizations (e.g., FEMA)

Dynamic groups can be used for event creation based on the availability of other users in the region or location. Another usage of dynamic group is to check availability of resources, such as food, supply, medical, etc. A disaster response organization such as FEMA can have multiple subgroups, "supply", "medical", "supply", etc., and may have send messages to inquire the availability of such resources. Based on the availability response from these subgroups, FEMA can allocate, deliver, replenish each of these resources. In addition, each of the FEMA subgroups can comprise of all government, or a combination of government, non-government organizations, or corporations. For example, "communication" unit could be the "County Communication" which is a local government, or amateur radio group "Radio Amateur Communication for Emergency (RACE)", which is a non-governmental organization. Similarly, the "medical" unit can be city "EMT" team or the Red Cross "First Aid Service Team (FAST)". Dynamic group such as the "Strike Team", "Task Force" can be dynamically created, used, or deleted based on the needs of FEMA.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for managing an emergency situation, comprising:
    (a) receiving, at a server, data obtained by a plurality of mobile computing devices associated with a plurality of users, wherein the data comprises at least a series of geolocation sensor data obtained by each of the plurality of mobile computing devices at multiple time points, and wherein the series of geolocation sensor data obtained by each of the plurality of mobile computing devices at multiple time points are processed to derive an address of each of the plurality of users;
    (b) generating, based at least in part on the address derived from the data, a hierarchical structure comprising a plurality of groups, wherein each of the plurality of the users is associated with at least one group among the plurality of groups and wherein the hierarchical structure comprises at least an owner or moderator for each of the plurality of groups;
    (c) transmitting, to a mobile computing device of a user of the plurality of users, a safety check request for the user to respond, wherein the safety check request is generated by the owner or moderator of the at least one group that the user is associated with and the safety check request is displayed on a mobile application resident on the mobile computing device of the user; and
    (d) automatically regenerating and transmitting the safety check request to the mobile computing device of the user until a response indicating a safety status of the user is received by the server.

2. The method of claim 1, further comprising transmitting a geolocation of the user to a mobile device of the owner or moderator for display when the response indicating the safety status of the user is not received within a predetermined period of time.

3. The method of claim 2, wherein the geolocation of the user is displayed on a map provided on a mobile application resident on the mobile computing device of the owner or the moderator.

4. The method of claim 2, further comprising transmitting an instruction to the mobile application resident on the mobile computing device of the user to flash one or more different colors on the display of the mobile computing device of the user.

5. The method of claim 4, wherein the instruction further comprises configuring the mobile application resident on the mobile computing device of the user to generate one or more types of audible tones on the mobile computing device of the user.

6. The method of claim 1, wherein an instruction is transmitted to a mobile application resident on the mobile computing device of the owner or moderator for displaying an SOS request when the safety status indicates an emergency situation of the user.

7. The method of claim 1, further comprising processing the data obtained from the plurality of the mobile computing devices to extract information on the plurality of the users.

8. The method of claim 7, wherein the information on the plurality of the users include at least two or more of a role attribute, a group attribute, status of the users, and location of the users.

9. The method of claim 8, wherein the role attribute includes a role type and a role policy for management of a group, wherein each of the plurality of groups include at least three role types, the role policy configured to restrict one or more settings for communication among the different role types.

10. The method of claim 9, wherein the one or more settings comprise a privacy setting for determining the information on the plurality of the users can be shared within a group or among different groups.

11. A computer-implemented method for adding a new user, comprising:
    (a) receiving, at a server, data obtained by a plurality of mobile computing devices associated with a plurality of users, wherein the data comprises at least a series of geolocation sensor data obtained by each of the plurality of mobile computing devices at multiple time points, and wherein the series of geolocation sensor data obtained by each of the plurality of mobile computing devices at multiple time points are processed to derive an address of each of the plurality of users;
    (b) generating, based at least in part on the address derived from the data, a hierarchical structure comprising a plurality of groups, wherein each of the plurality of the users is associated with at least one group among the plurality of groups and wherein the hierarchical structure comprises at least an owner or moderator for each of the plurality of groups; and
    (c) adding a new user to one of the plurality of groups by generating a QR code associated with the group for the new user to scan.

12. A computer-implemented method for requesting resources, comprising:
    (a) receiving, at a server, data obtained by a plurality of mobile computing devices associated with a plurality of users, wherein the data comprises at least a series of geolocation sensor data obtained by each of the plurality of mobile computing devices at multiple time points, and wherein the series of geolocation sensor data obtained by each of the plurality of mobile computing devices at multiple time points are processed to derive an address of each of the plurality of users;
    (b) generating, based at least in part on the address derived from the data, a hierarchical structure comprising a plurality of groups, wherein each of the plurality of the users is associated with at least one group among the plurality of groups and wherein the hierarchical structure comprises at least an owner or moderator for each of the plurality of groups; and
    (c) transmitting, to a mobile computing device of an owner or moderator for at least one of the plurality of groups, a resource request for one or more resources selected from volunteers, logistics, supplies, food, water and equipment for the owner or moderator to respond, wherein the request is generated by the user of the at least one group that the owner or moderator is associated with and the request is displayed on a mobile application resident on the mobile computing device of the owner or moderator.

13. The method of claim 12, further comprising tracking the deliver, inventory, usage, or disposal of the one or more resources.

14. A computer-implemented method for creating events, comprising:
- (a) receiving, at a server, data obtained by a plurality of mobile computing devices associated with a plurality of users, wherein the data comprises at least a series of geolocation sensor data obtained by each of the plurality of mobile computing devices at multiple time points, and wherein the series of geolocation sensor data obtained by each of the plurality of mobile computing devices at multiple time points are processed to derive an address of each of the plurality of users;
- (b) generating, based at least in part on the address derived from the data, a hierarchical structure comprising a plurality of groups, wherein each of the plurality of the users is associated with at least one group among the plurality of groups and wherein the hierarchical structure comprises at least an owner or moderator for each of the plurality of groups; and
- (c) creating events by the user of one of the plurality of groups, wherein each of the events is viewable by one or more users selected from the plurality of users.

15. The method of claim 14, wherein the one or more selected users communicate messages with aid of the server, wherein the messages include comments and are displayed to the one or more users on the associated one or more mobile computing devices in the form of text, picture, video, or live streaming.

16. The method of claim 14, wherein creating the event comprising specifying a duration, time, or location of the event.

17. The method of claim 14, wherein the event is a fund raising or donation event.

18. A computer-implemented method for communication in private channels, comprising:
- (a) receiving, at a server, data obtained by a plurality of mobile computing devices associated with a plurality of users, wherein the data comprises at least a series of geolocation sensor data obtained by each of the plurality of mobile computing devices at multiple time points, and wherein the series of geolocation sensor data obtained by each of the plurality of mobile computing devices at multiple time points are processed to derive an address of each of the plurality of users;
- (b) generating, based at least in part on the address derived from the data, a hierarchical structure comprising a plurality of groups, wherein each of the plurality of the users is associated with at least one group among the plurality of groups and wherein the hierarchical structure comprises at least an owner or moderator for each of the plurality of groups; and
- (c) creating one or more private communication channels, wherein any given user from the plurality of users is allowed to communication with one or more users from the same group or a different group on at least one private channel of the plurality of the created private channels.

19. The method of claim 18, wherein the messages of the private channel is in the form of text, video call or audio call.

20. A system for managing an emergency situation comprising:
- a computer server in communication with a plurality of mobile computing devices over a network, wherein the computer server is programmed to:
  - (a) receive data obtained by the plurality of mobile computing devices associated with a plurality of users, wherein the data comprises at least a series of geolocation sensor data obtained by each of the plurality of mobile computing devices at multiple time points, and wherein the series of geolocation sensor data obtained by each of the plurality of mobile computing devices at multiple time points are processed to derive an address of each of the plurality of users;
  - (b) generate, based at least in part on the address derived from the data, a hierarchical structure comprising a plurality of groups, wherein each of the plurality of the users is associated with at least one group among the plurality of groups and wherein the hierarchical structure comprises at least an owner or moderator for each of the plurality of groups;
  - (d) transmit, to a mobile computing device of a user of the plurality of users, a safety check request for the user to respond, wherein the safety check request is generated by the owner or moderator of the at least one group that the user is associated with and the safety check request is displayed on a mobile application resident on the mobile computing device of the user; and
  - (e) automatically regenerate and transmit the safety check request to the mobile computing device of the user until a response indicating a safety status of the user is received.

* * * * *